United States Patent
Fells et al.

(10) Patent No.: US 11,467,337 B2
(45) Date of Patent: Oct. 11, 2022

(54) METHOD OF LASER MODIFICATION OF AN OPTICAL FIBRE

(71) Applicant: Oxford University Innovation Limited, Oxford (GB)

(72) Inventors: Julian Fells, Oxford (GB); Martin Booth, Oxford (GB); Patrick Salter, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 82 days.

(21) Appl. No.: 16/636,364

(22) PCT Filed: Aug. 7, 2018

(86) PCT No.: PCT/GB2018/052257
§ 371 (c)(1),
(2) Date: Feb. 4, 2020

(87) PCT Pub. No.: WO2019/030521
PCT Pub. Date: Feb. 14, 2019

(65) Prior Publication Data
US 2020/0166698 A1    May 28, 2020

(30) Foreign Application Priority Data
Aug. 7, 2017   (GB) ..................................... 1712640

(51) Int. Cl.
*G02B 6/02*    (2006.01)
(52) U.S. Cl.
CPC ..... *G02B 6/02147* (2013.01); *G02B 6/02123* (2013.01); *G02B 2006/02161* (2013.01)

(58) Field of Classification Search
None
See application file for complete search history.

(56) References Cited

U.S. PATENT DOCUMENTS

| | | | |
|---|---|---|---|
| 5,090,795 A | 2/1992 | O'Meara et al. | |
| 5,589,955 A * | 12/1996 | Amako | G03H 1/2294 359/9 |
| 6,532,074 B1 | 3/2003 | Wilcox et al. | |

(Continued)

FOREIGN PATENT DOCUMENTS

| | | |
|---|---|---|
| WO | 2009/005746 A1 | 1/2009 |
| WO | 2012/123715 A1 | 9/2012 |

OTHER PUBLICATIONS

C. Hill et al. Single mode air-clad single crystal sapphire optical fiber. Applied Sciences 7, 473, May 2017. (Year: 2017).*

(Continued)

*Primary Examiner* — Michael Stahl
(74) *Attorney, Agent, or Firm* — Thomas | Horstemeyer, LLP

(57) ABSTRACT

Method of laser modifying an optical fibre to form a modified region at a target location within the fibre, comprising positioning at least a portion of an optical fibre in a laser system for modification by a laser, applying a correction to an active optical element of the laser system to modify wavefront properties of the laser to counteract an effect of aberration on laser focus, and laser modifying the optical fibre at the target location using the laser with the corrected wavefront properties to produce the modified region.

21 Claims, 22 Drawing Sheets

(56) References Cited

U.S. PATENT DOCUMENTS

| | | | |
|---|---|---|---|
| 6,911,659 B1* | 6/2005 | Malo | G02B 6/02123 |
| | | | 250/492.1 |
| 9,415,461 B2* | 8/2016 | Ito | B23K 26/36 |
| 2004/0184731 A1* | 9/2004 | Mihailov | G02B 6/02138 |
| | | | 385/37 |
| 2015/0043054 A1* | 2/2015 | Booth | G02B 27/09 |
| | | | 359/291 |
| 2015/0160409 A1 | 6/2015 | Lai et al. | |
| 2015/0219937 A1* | 8/2015 | Matsumoto | B23K 26/0622 |
| | | | 359/279 |
| 2017/0031090 A1 | 2/2017 | Bernier et al. | |
| 2018/0179106 A1* | 6/2018 | Schowengerdt | G02B 6/02 |
| 2020/0164470 A1* | 5/2020 | Booth | B23K 26/0648 |

OTHER PUBLICATIONS

C. Mauclair et al. Ultrafast laser writing of homogeneous longitudinal waveguides in glasses using dynamic wavefront correction. Optics Express, 16:8:5481-5492, Apr. 14, 2008. (Year: 2008).*
International Search Report and Written Opinion for PCT/GB2018/052257, dated Jan. 9, 2019, pp. 1-17.
UK Search Report for GB 1712640.0, dated Feb. 2, 2018, pp. 1-5.
Yijing Chen et al.: "Distortion-free femtosecond laser inscription in free-standing optical fiber", Applied Optics, yol. 55, No. 21, Jul. 13, 2016 (Jul. 13, 2016), pp. 5575-5579.

* cited by examiner

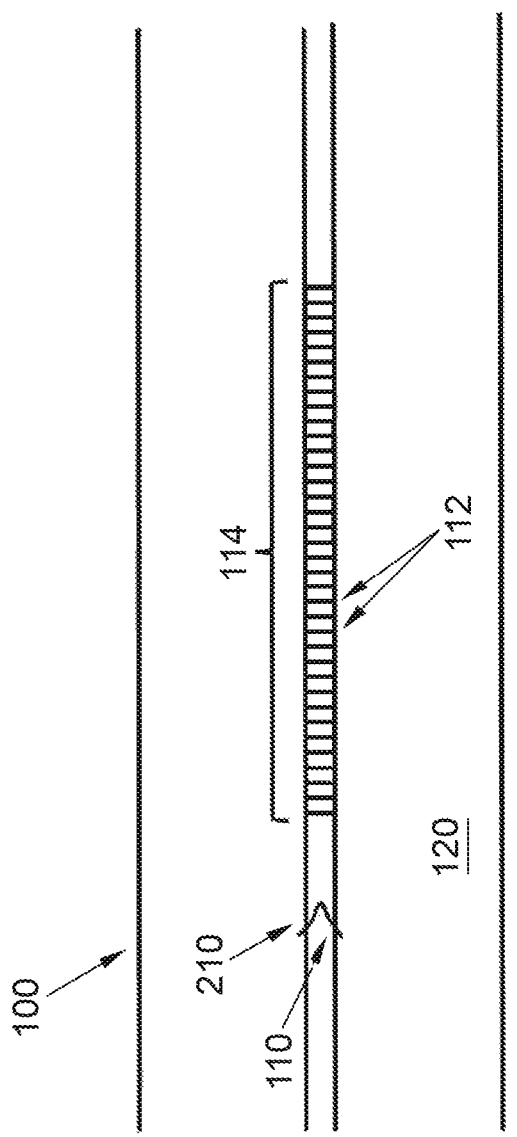

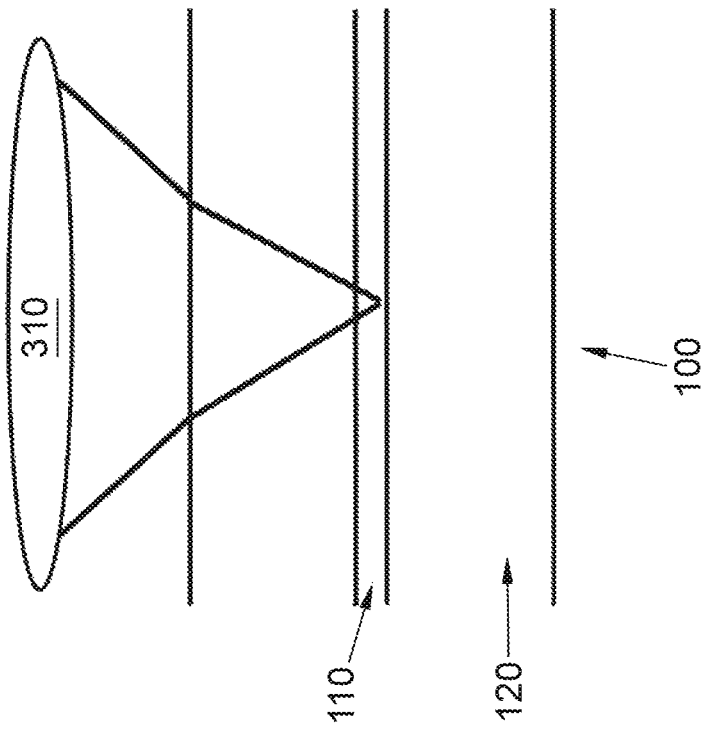
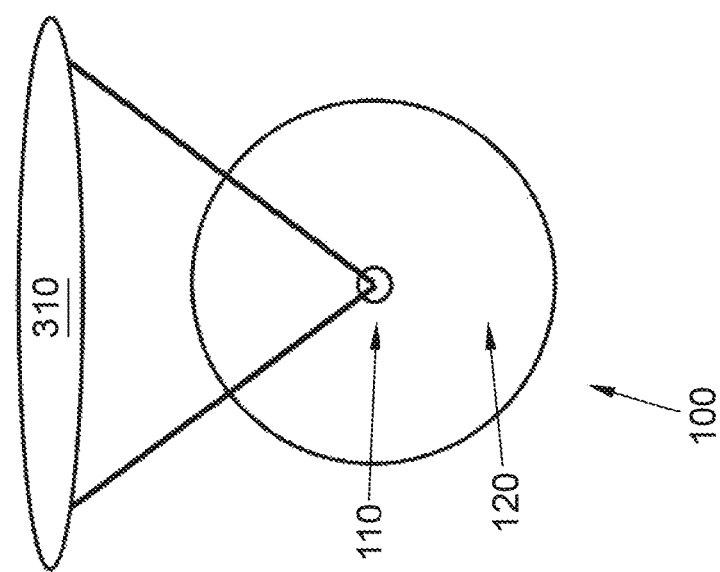
Fig. 4A
Fig. 4B

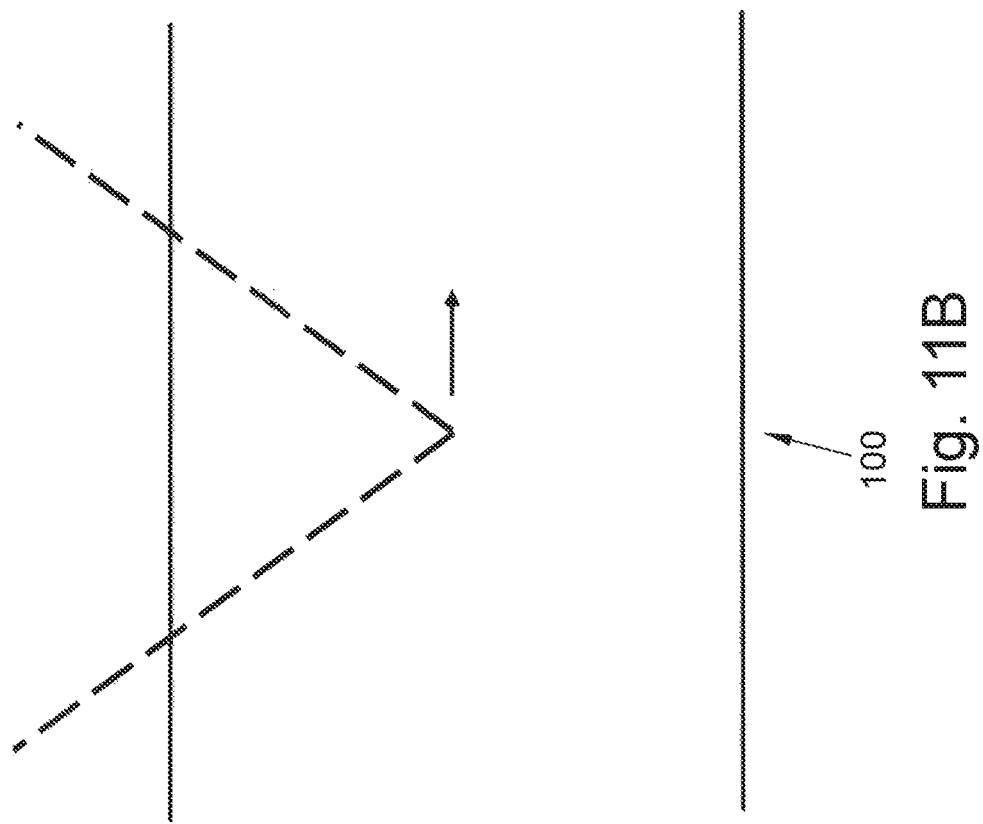
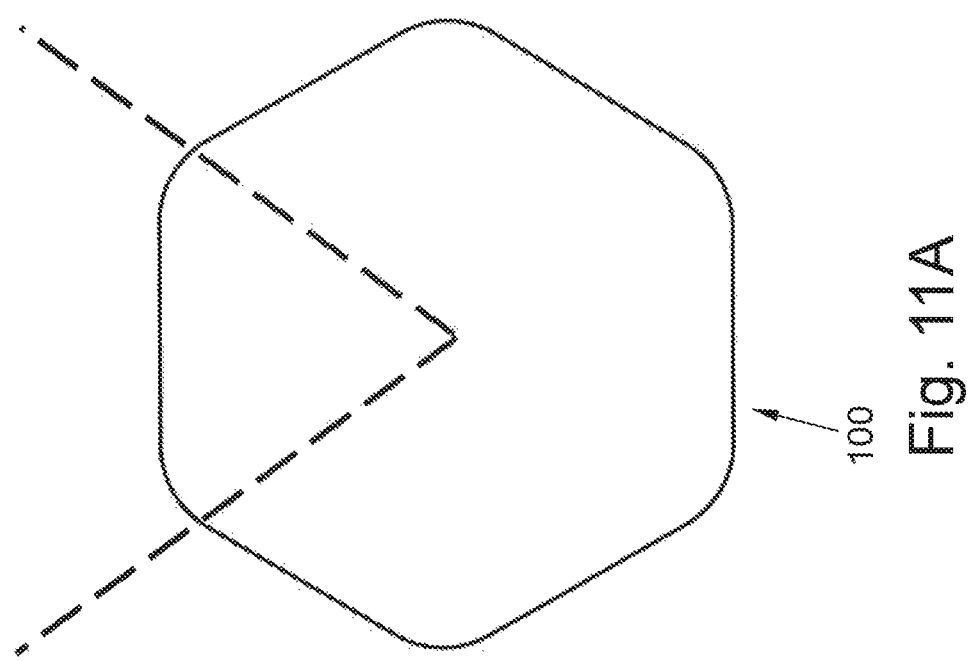

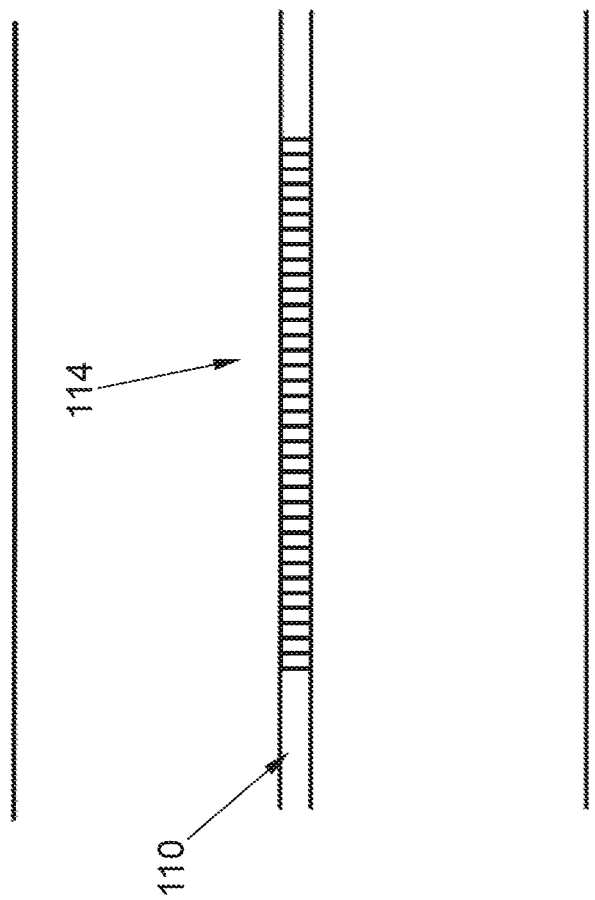
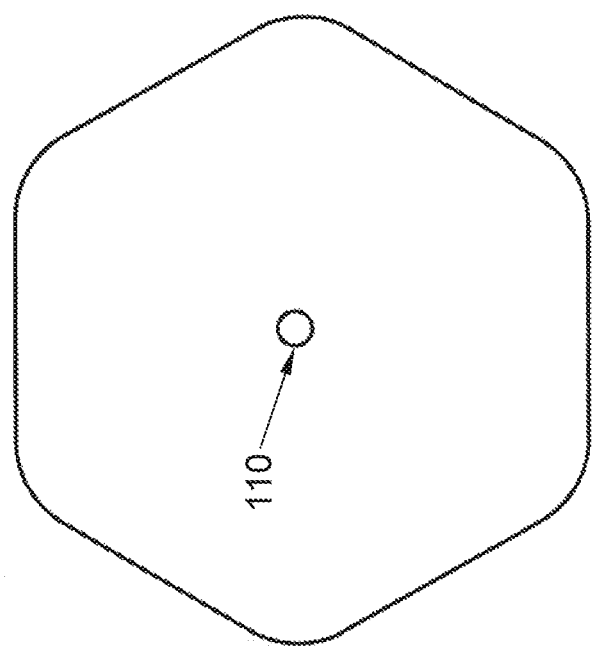

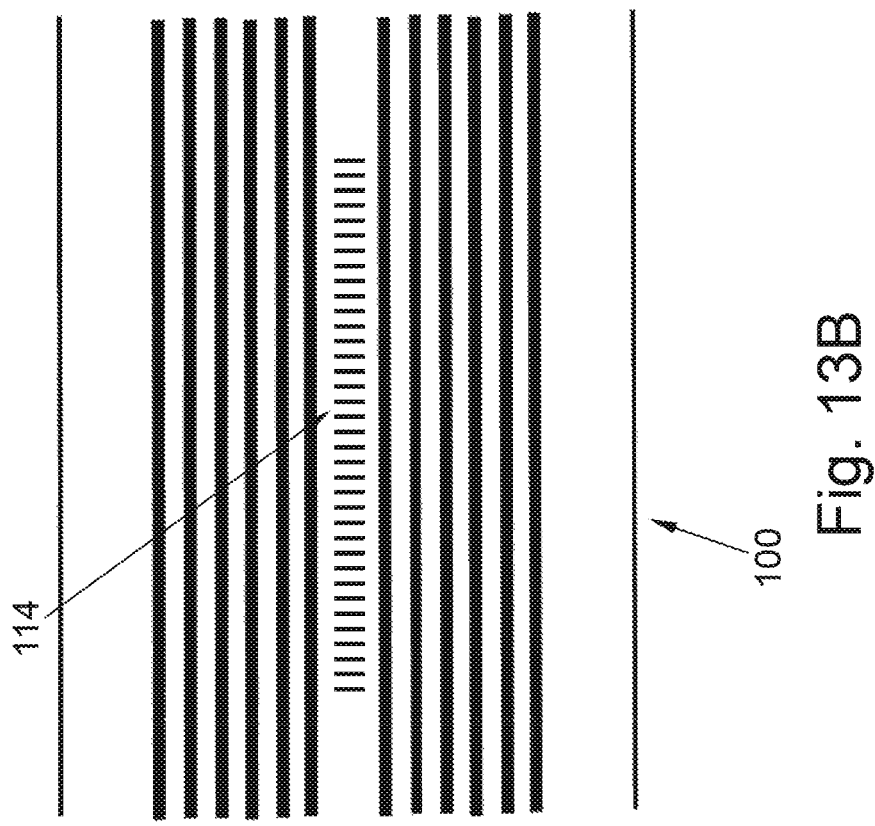
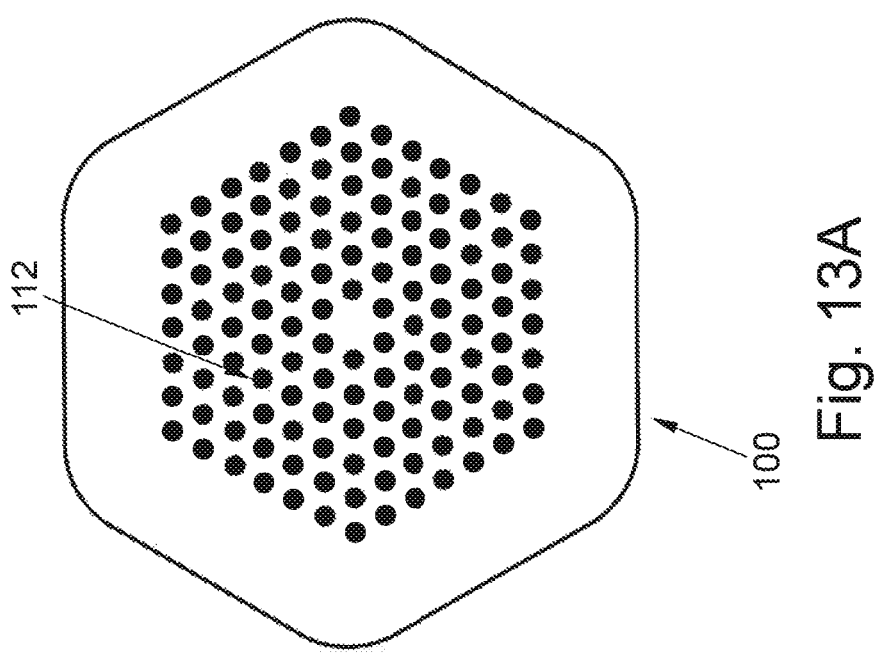

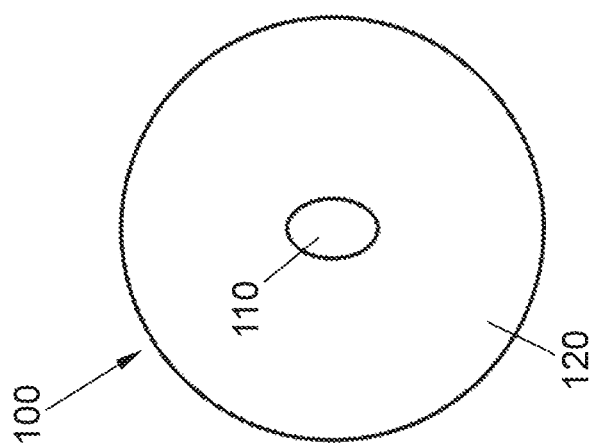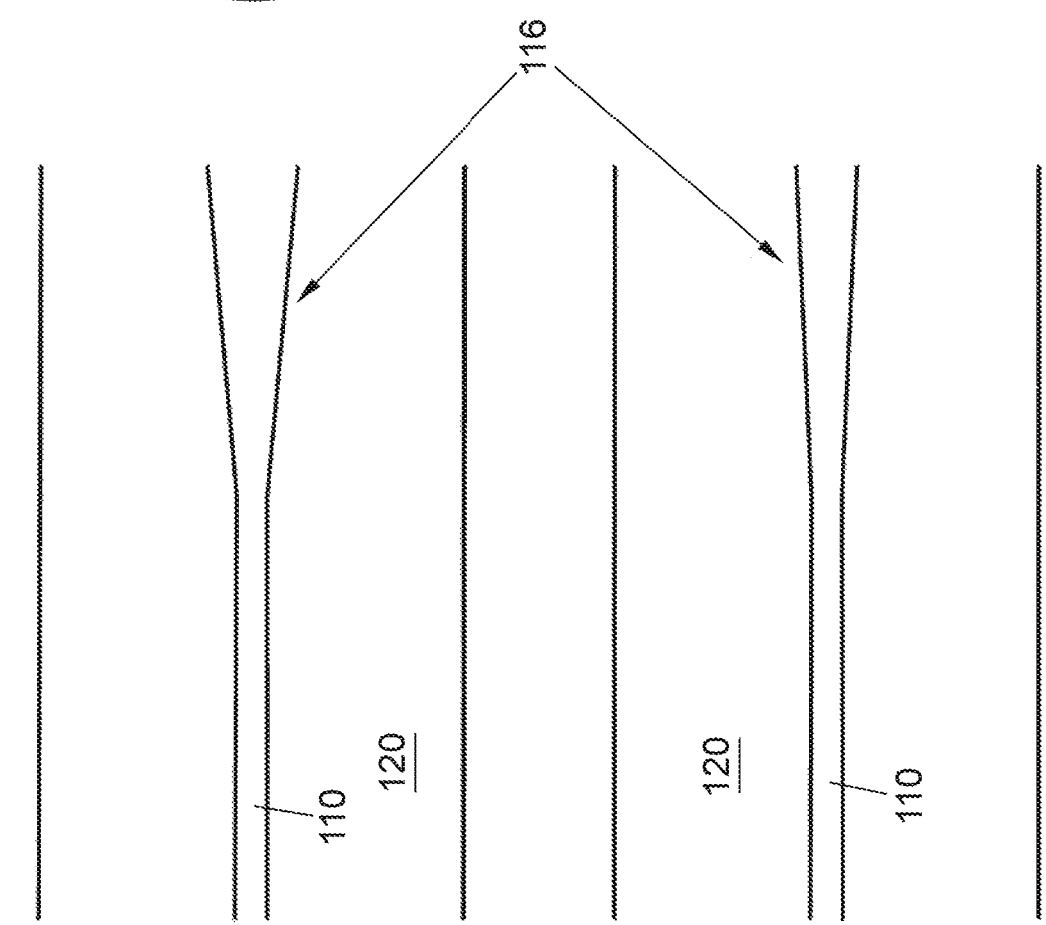

METHOD OF LASER MODIFICATION OF AN OPTICAL FIBRE

CROSS-REFERENCE TO RELATED APPLICATIONS

This application is the National Stage of International Application No. PCT/GB2018/052257, filed Aug. 7, 2018, which claims priority to GB 1712640.0, filed Aug. 7, 2017, which are entirely incorporated herein by reference.

FIELD

The invention provides a method of laser modification of an optical fibre, particularly a method of laser modification of an optical fibre comprising applying a correction to the laser to counteract aberration effects in the manufacture of fibre Bragg gratings.

BACKGROUND

A diverse range of components may be manufactured by laser writing in optical fibre. These have many applications in telecommunications, sensors and other fields. For example optical fibre sensors may be used for monitoring temperature and strain in extreme and inaccessible environments in oil and gas turbomachinery and marine structures in order to prevent catastrophic failure and improve efficiency. They are also used in healthcare for monitoring during procedures and analysis of samples.

One such optical component is the fibre Bragg grating (FBG), illustrated diagrammatically in FIG. 1. FIG. 1 shows an optical fibre 100 with an optical core 110 surrounded by cladding 120. An optical mode 210 propagates along the optical core. The core 110 comprises index modifications 112, which together form a fibre Bragg grating 114. The FBG 114 formed in the core 110 of the optical fibre 100 is a longitudinally periodic modulation of the fibre's effective refractive index. FBGs reflect light at a wavelength determined by the pitch of the refractive index modulation according to $$\lambda_B = 2n_{eff} \Lambda/m$$

where $\lambda_B$ is the wavelength at which light is reflected (the Bragg wavelength), $\Lambda$ is the pitch of the modulation (grating pitch), $n_{eff}$ is the effective refractive index of the fibre, and m is the order of the grating. Typically optical fibres are exposed to laser light in the ultraviolet (e.g. 244 nm) or infrared (e.g. 800 nm) to change the refractive index of the core periodically along the fibre length. The periodicity may be imparted in a number of ways, for example by forming an interference pattern between two beams at an angle to one another, using a phase mask, or by scanning a pulsed laser along the fibre writing each line point by point.

FBGs are most commonly written using a continuous wave or short pulse UV laser. In order to make the optical fibre sensitive to UV light it is typically boron-germanium co-doped or alternatively a standard silica fibre is loaded with hydrogen. However, gratings written like this have limited stability, for example the hydrogen can leak out over time. A significant disadvantage is that the grating is typically erased when the fibre is exposed to temperatures over 300° C. Using an infra-red laser (e.g. 800 nm) with short pulses (e.g. 100 fs) has the advantage that the resulting gratings are inherently more stable and can withstand far higher temperatures. However, the combination of a longer wavelength and optical aberration of the writing laser beam means that these gratings have inferior performance. As the aberration limits the spatial resolution achievable, FBGs written with a short pulse laser are typically second order. Second order gratings have a pitch which is twice that of the equation above and are less efficient. The aberration also results in other deficiencies such as: polarisation dependence, coupling to cladding modes (resulting in loss at wavelengths shorter than the Bragg reflection) and poor spectral uniformity.

Various attempts have been made to mitigate the effects of aberration. One technique is to use an oil immersion lens with the fibre directly immersed in the oil next to the objective lens. Another technique is to use a ferrule to contain the fibre (again immersed in oil) with a flat polished edge to focus through. However, it is desirable not to have to use immersion oil which complicates the manufacture process and requires cleaning between fabrication jobs. Chen et al. "Distortion-free femtosecond laser inscription in free-standing optical fiber"; Applied Opt., Vol. 55, No. 21, Jul. 20, 2016, 5575-9, use static lenses to improve the focus within a fibre.

SUMMARY

According to a first aspect of the present invention there is provided a method of laser modifying an optical fibre to form a modified region at a target location within the fibre, comprising: positioning at least a portion of an optical fibre in a laser system for modification by a laser; applying a correction to an active optical element of the laser system to modify wavefront properties of the laser to counteract an effect of aberration on laser focus; and laser modifying the optical fibre at the target location using the laser with the corrected wavefront properties to produce the modified region.

The present invention may therefore be used for fabricating optical fibre devices using direct laser writing and an adaptive optical element to correct for optical aberration. It may be used for fabrication of fibre Bragg gratings which can be used to measure amongst other things strain, temperature and pressure in extreme environments. Such devices have applications in oil and gas, turbomachinery, chemical plants, healthcare and many other fields.

Fibre Bragg gratings are typically written using an ultraviolet laser in photosensitive fibre; these gratings are not very stable and can typically only withstand temperatures of up to about 300° C. Ultra short pulse infra-red lasers can write fibre Bragg gratings which can withstand temperatures of 1000° C. in standard fibre, but the writing process is limited by optical aberration. This gives two disadvantages i) the manufacture process is more complex and therefore expensive as techniques to mitigate optical aberration typically use immersion oil and ferrules; ii) even with known techniques to mitigate aberration, the quality of the gratings is poor (e.g. they have poor spectral quality, high loss at short wavelengths and high polarisation dependence).

The present invention allows gratings which are stable to high temperatures (e.g. greater than 300° C., greater than 1000° C., or greater than 2000° C.) to be written which have a simpler and less expensive manufacturing process and which are of superior quality. The additional precision also allows new device structures which are not possible with conventional fabrication techniques.

When focusing into a material of a different refractive index, there is refraction at the interface causing spherical aberration distortion, such that the beam is not as tightly focused. An optical fibre additionally has aberration distortion as a result of its cylindrical geometry. In a cylindrical optical fibre, the axial rays (i.e. rays in a plane of the longitudinal axis of the fibre) and the radial rays (i.e. rays in a transverse plane of the fibre) focus at different depths, resulting in astigmatism. As a result of the aberration, the spot size of the focused beam is much broader, so the precision is much poorer. To write fibre gratings, very high precision is required in the longitudinal direction, with line separations of about 500 nm. The astigmatism results in significant broadening in the longitudinal direction meaning that the grating is blurred out.

The present invention in the first aspect uses an adaptive optical element, such as a spatial light modulator to pre-distort the wavefront of the writing beam, such that it compensates for the aberration introduced.

The invention may also be used for fabricating single mode sapphire optical fibre. Sapphire optical fibre can withstand temperatures up to 2000° C. However, no single mode sapphire fibre exists. It has a high refractive index and no index matching oil exists for it. The present invention allows standard multimode sapphire fibres to be machined into single mode fibres.

As described above, light focused from an objective lens into a fibre will be aberrated from its ideal focus because of refraction at the fibre's surface. The larger the difference between the refractive indices of the immersion medium (e.g. air, oil, etc.) and the fibre, the larger the aberrating effect on the focus. The determined correction therefore accounts for the effects of refraction at the fibre's surface and/or interfaces in order to counteract the destructive aberrating effect of the fibre. Different factors can contribute to different types of aberrations (or aberration modes) on the focus. A fibre has a surface which is cylindrical and hence will not typically permit an ideal focus. Instead, light from different regions of an objective lens will encounter different regions of the cylindrical surface of the fibre and hence will undergo different degrees of refraction. The result is a focus within the fibre that is distorted by astigmatic aberration. Usually the distortion is accepted, but for some applications (e.g. high precision FBGs) it may be necessary to improve the focus within the fibre to obtain greater control over manufacture of fibre components.

A modified region may be any region within the fibre that has undergone change due to exposure to the laser. Typically, a modified region will comprise different properties and may comprise different optical, structural, mechanical, electrical etc. properties from the bulk material of the fibre surrounding it. A modified region may have a different refractive index to the bulk material. The refractive index change of the modified region may be a positive refractive index change (i.e. an increase in refractive index). The refractive index change of the modified region may be a negative refractive index change (i.e. a decrease in refractive index).

An active optical element is any element which may dynamically modify the properties of light incident thereon. For example, spatial light modulators (SLMs), and deformable mirrors (or micro-deformable mirrors), and adaptive lenses are active optical elements which may be used to dynamically impose spatially varying modulations on a laser beam's profile to thereby control e.g. its phase and/or propagation properties.

The focus of the corrected laser may have a Strehl ratio of at least 0.5. That is, the disclosed method of aberration correction may achieve a laser focus within the fibre having a Strehl ratio of greater than 0.5. The method may include modifying the fibre using a laser focus with a Strehl ratio of greater than 0.5. The focus may have a Strehl ratio of greater than 0.6, greater than 0.7, greater than 0.8, or greater than 0.9. The Strehl ratio may be understood as a measure of how close a focus is to its ideal (i.e. diffraction limited) focus. A laser focus limited only by the inherent diffraction of the focusing system (i.e. a laser focus the size of the diffraction limit) would have a Strehl ratio of 1. In practice, inherent flaws in an optical system will result in a focus which is not the size of the diffraction limit and which will therefore have a Strehl ratio of less than 1. A Strehl ratio of about 0.1 may be typical for a laser focused within a fibre without aberration correction. The Strehl ratio may therefore be understood as a measure of the effect of aberration on a laser focus, with ratios closer to 1 being less affected by aberrations and flaws in the system. It may also be understood as a measure of the efficiency of a given focus.

The Strehl ratio may be defined as the peak focal intensity relative to that when there are no aberrations present in the system. When a focus simply limited by diffraction has a peak intensity $I_0$ and a real system has peak intensity $I_p$ the Strehl ratio is defined as the ratio $I_p/I_0$. If aberrations are present in a system, wavefront errors diffract light away from the focus and reduce the actual peak intensity $I_p$ from the theoretical maximum $I_0$, thus reducing the Strehl ratio. If the wavefront error is characterised as an aberration phase function $\varphi$, the Strehl ratio S is given by:

$$S = \frac{I_p}{I_0} = |\langle e^{i\varphi}\rangle|^2$$

where the $\langle \ldots \rangle$ angled brackets denote an average over a particular aperture in the optical system, taken here as the pupil aperture of the focussing objective lens. For a perfect system, the wavefront error is zero (flat phase) and the Strehl ratio is 1. If the wavefront error increases due to aberration the Strehl ratio decreases. The aberration function describes all phase errors related to the propagation of light toward the focus, and may be written as a sum of Zernike polynomials such as primary coma, primary spherical and primary astigmatism. The aberration function may alternatively be composed as a sum of another set of basis functions, or as a direct numerical computation/analytical solution for a particular focussing location inside a known sample.

The correction may be defined by an expansion of orthogonal modes. Each mode may define an aberration mode. The correction may be a pure mode, or the correction may be a superposition of modes. The correction may be defined by a Zernike polynomial, or may be defined by an expansion of Zernike polynomials. The phase correction may be defined as a superposition of modes using an orthogonal basis other than the Zernike polynomials. The phase correction may be an analytic solution e.g. for a particular geometry, or a numerical solution for a particular focussing geometry. The phase correction might be determined through an iterative optimisation using a method of focal feedback.

The correction may comprise a phase field for modulating a laser beam profile to a desired profile. For example, the method may use a spatial light modulator (SLM) and the correction may represent a display field for an SLM. The method may use a deformable mirror (DM) and the correction may be a setting configuration for the deformable mirror. The correction may be a configuration for an adaptive lens.

The step of determining the correction to be applied to the active optical element may be based at least upon characteristics of the optical fibre. For example, the correction may be determined based upon the refractive index of the fibre, its size and/or circumference, and/or whether it comprises cladding and/or channels therein. The correction may be determined based upon the cylindrical curvature of the fibre and the resulting astigmatic aberration. The method may comprise using different corrections for different optical fibres, and hence may include tailoring corrections to the fibre to be modified. The theory for aberrations in an optical fibre is described in Schwertner et al., "Simulation of specimen-induced aberrations for objects with spherical and cylindrical symmetry", Journal of Microscopy, Vol. 215, Pt 3 Sep. 2004, pp. 271-280. The fibre parameters may be measured directly, or may be determined from a manufacturer's data sheet.

The step of determining the correction may comprise determining the correction based upon the position of the target location within the fibre. For example, the correction for focusing within the centre of the fibre may be different to that required for focussing at an edge of the fibre, since light from the objective lens may encounter different regions of the fibre surface and hence will undergo different refraction to reach the target location.

The method may comprise applying a different correction to the active optical element for different positions within the fibre. For example, a correction at the centre of the fibre may account for astigmatic aberration, and a radial distance from the centre may account also for coma and spherical aberration.

The step of applying the correction to the active optical element may comprise applying the correction to the active optical element to modify wavefront properties of the laser to counteract an effect of astigmatic aberration on laser focus. The step of applying the correction to the active optical element may comprise applying the correction to the active optical element to modify wavefront properties of the laser to counteract an effect of spherical aberration on laser focus. The step of applying the correction to the active optical element may comprise applying the correction to the active optical element to modify wavefront properties of the laser to counteract an effect of coma on laser focus. The method may comprise apply the correction to the active optical element to counteract the effects of multiple aberration modes on the focus.

The method may comprise determining or measuring the characteristics of the optical fibre and determining the correction based at least upon that measurement. The method may comprise measuring the shape, diameter, radius, curvature, angle of an incident surface of the fibre with respect to the beam propagation direction.

The method may comprise measuring the curvature of the cylindrical cross-section of the fibre.

The method may comprise measuring the laser focus within the optical fibre and determining the correction based at least upon that measurement. The method may comprise imaging the laser focus within the fibre (e.g., using a camera and/or fluorescence) and modifying the correction applied to the active optical element based upon that measurement of the focus. Hence, the method may comprise implementing a feedback loop to monitor the focus within the fibre and modify the correction based upon the monitored focus.

The method may include monitoring the focus within the fibre and using an algorithm to iteratively alter the correction applied to the active optical element in order to improve the focus within the fibre. The algorithm may repeatedly change the configuration of the active optical element (e.g. the display on an SLM) until the imaged focus spot size is at a minimum. The method may include carrying out feedback to optimise the focus at a laser pulse energy below a modification threshold of the fibre so as not to modify the fibre during the feedback process.

The method may comprise changing the correction based upon a change of the target location within the optical fibre. Hence, the method may comprise determining a second correction based upon an updated target location within the fibre. The second correction may be determined in any way as described with reference to the first correction. Thus, the method may include dynamically determining and/or updating the correction to modify different regions of the fibre. The laser may be focussed at different locations within the fibre and the aberration correction applied thereto may be changed to account for the difference in location.

The method may include determining a correction based upon a laser modified region within the fibre. Thus, the aberration correction may counteract the refractive effects of a laser modified region within the fibre, in addition to counteracting the refractive effects of the (unmodified) fibre. The method may therefore be used to laser modify a region of the fibre using light which has passed through a laser modified region. The method may comprise modifying the correction to account for non-uniformity of the fibre.

The method may comprise translating the optical fibre during modification thereof to create axially separated laser modified regions. The optical fibre may be translated along its longitudinal axis at a constant speed, and the repetition rate of the laser pulses together with the longitudinal movement of the fibre may define a periodic modification of the fibre. The fibre may be translated at a varying speed and the spacing between modified regions of the fibre may be different. The fibre may be moved sufficiently slowly so that the modified regions within the fibre overlap and hence a continuous line of the fibre may be laser modified.

The method may comprise translating the optical fibre during modification in a transverse direction perpendicular to its longitudinal axis. The method may comprise rotating the optical fibre about its longitudinal axis. The method may comprise rotating the optical fibre to create angularly separated laser modified regions at a predetermined radius. The fibre may be rotated sufficiently slowly so that the modified regions within the fibre overlap and hence a continuous arc within the fibre may be laser modified. The method may comprise translating and/or rotating the fibre to place the laser focus at the desired location within the fibre. Alternatively, the method may comprise modifying the correction so as to account for aberration at a desired location within the fibre and thereby avoid the need to rotate the fibre, since physical rotation of the fibre may need to be carried out to a high degree of precision.

The method may comprise modifying the configuration of the active optical element to change the location of the laser focus within the fibre, and hence may comprise updating the correction to account for aberrations specific to the new location. The method may comprise modifying the configuration of the active optical element and moving the fibre to position the focus of the laser at a desired location within the fibre. The method may comprise varying the size of the focus within the fibre to vary the size of the laser modified region.

The method may comprise varying the repetition rate of the laser. On its own, or together with the translation/rotation of the fibre, variation of the repetition rate of the fibre may be used to control the spacing of laser modified regions within the fibre, and may e.g. control the pitch of a FBG.

Producing the modified region may comprise forming at least a section of an optical core of the fibre. The method may comprise laser modifying the fibre to from an optical core therein. The method may comprise forming a plurality of sections of optical cores, and may comprise forming a plurality of optical cores. Each core may have different optical properties. Alternatively, each core may have the same optical properties. Some of the plurality of optical cores may have the same optical properties and others of the plurality of optical cores may have different optical properties.

The method may comprise forming the modified region within an optical core of the optical fibre. The method may comprise forming a fibre Bragg grating within the fibre. The method may therefore comprise modifying a plurality of regions within the fibre at predetermined separations to create a fibre Bragg grating. The method may comprise forming a plurality of FBGs, and may comprise forming FBGs for different wavelengths and/or for the same wavelength. The method may comprise forming FBGs in parallel within the fibre and/or may comprise forming FBGs in series within the fibre. The method may comprise forming FBGs of different wavelengths overlaid in the same position in the optical core. The FBGs may be within different cores of the fibre at the same longitudinal points.

The method may comprise modifying a plurality of regions which are spatially separated from one another within a transverse cross-section of the fibre. The method may comprise modifying spatially separate regions within the fibre to strain a neighbouring or nearby region in order to modify the optical properties thereof. For example, regions surrounding the centre of a fibre may be modified to create a strain field on the centre of the fibre and thereby change its optical properties and hence turn the centre into an optical core with desired properties, albeit a core that has not itself been directly modified using the laser.

The method may comprise simultaneously modifying a plurality of spatially separate regions within the optical fibre. The regions may be axially coincident or may be axially spaced along the fibre. To create simultaneous spatially separated foci within the fibre the method may comprise partitioning the active optical element to generate separate foci. The method may comprise using a diffractive pattern on the active optical element that generates multiple diffractive orders, each one representing a different focus. The phase pattern may be designed such that each diffractive focus has a different aberration compensation phase. The method may comprise applying different corrections to different regions of the active optical element to generate separate foci, and the method may comprise applying different corrections to the different regions of the active optical element to apply suitable corrections to each for the foci based upon the desired location of the particular focus within the fibre.

The correction may be a phase field comprising a discontinuity for applying different corrections to rays incident on different parts of the fibre.

The correction may counteract an effect of aberration on laser focus caused by any and all interfaces within the fibre. For example, the correction may counteract aberration caused by an interface between air and a protective coating of the fibre, between air and cladding, between a protective coating and cladding, and/or between cladding and a fibre core.

The correction may counteract an effect of astigmatic aberration on laser focus caused by the outer surface of the fibre, and/or an effect of astigmatic aberration on laser focus caused by an interface between a fibre core and cladding surrounding the fibre core, and/or between a protective coating and cladding. The method may comprise determining a correction to counteract refraction and/or aberration from a plurality of interfaces of the fibre. The method may comprise partitioning the active optical element such that corrections are applied only to necessary light rays.

The correction may counteract an effect of coma on laser focus caused by the outer surface of the fibre, and/or an effect of coma on laser focus caused by an interface between a fibre core and cladding surrounding the fibre core, and/or between a protective coating and cladding. Different features of the fibre may cause different types of aberration and the correction may counteract the aberration modes caused by those features.

The method may comprise modifying a region of the fibre proximate a channel within the fibre. For example, the fibre may comprise channels such as air or fluid channels, and the region to be modified may be disposed at least partially behind such a channel. Hence the correction may account for aberration caused by the channels within the fibre. The correction may counteract aberration caused by any feature of the fibre.

The optical fibre may comprise a sapphire fibre, a sapphire-based fibre, a sapphire doped glass fibre, a photonic crystal fibre, a polymer fibre, a silica fibre, a hydrogel fibre, a high refractive index optical fibre (e.g. having a refractive index greater than 1.5, greater than 1.6, or greater than 1.7), a non-cylindrical optical fibre, a multimode fibre, a polarisation maintaining fibre, an air-hole fibre, and/or a multi-core fibre. The optical fibre may comprise any suitable material.

The method may comprise forming a single-mode sapphire optical fibre. The method may comprise forming an optical core within a sapphire multi-mode fibre using any of the methods described above. For example, a laser modified region may be formed in the sapphire fibre to create a core, or regions surrounding the core of the sapphire fibre may be modified to induce strain in the central region of the fibre and thereby modify its optical properties to create in effect an optical core. Such an optical core may also be created in some other locations of the sapphire optical fibre. A fibre Bragg grating may be written in the sapphire fibre.

The method may comprise modifying the optical fibre so as to reduce the number of modes supported by the fibre. The method may comprise modifying the optical fibre to prevent propagation therein of all but a single mode, and hence the method may comprise forming a single-mode optical fibre. The method may comprise modifying the optical fibre by laser writing a waveguide within the optical fibre. The method may comprise laser writing a waveguide in the optical fibre configured to reduce the number of modes that can propagate within the fibre. The method may comprise writing a waveguide configured to permit propagation of only a single mode within the fibre. The method may comprise writing a step-index waveguide within the optical fibre. The method may comprise writing a periodic structure waveguide. The method may comprise modifying the fibre to support (i.e. allow propagation of) fewer than a hundred modes, or fewer than 10 modes.

The method may comprise modifying the fibre to increase losses for predetermined propagating modes. For example, the method may comprise modifying the laser to comprise a waveguide configured to cause higher order modes (e.g.

higher order than a predetermined single mode) to experience increased losses during propagation. The method may comprise writing a waveguide within the fibre configured to cause a loss of greater than about 1 dB (decibel) per metre, about 3 dB per metre, or about 10 dB per metre for predetermined modes. The method may comprise modifying the optical fibre so that all but a single mode experience losses of greater than about 1 dB per metre, about 3 dB per metre, or about 10 dB per metre.

The method may comprise laser modifying the optical fibre refractive index selectively over its cross section to preferentially increase the loss of higher-order modes relative to the fundamental mode.

The method may comprise inscribing a structure in the fibre to disrupt the propagation of higher order modes such that they are scattered out of the fibre. The method may comprise using a laser to write concentric circles of modified refractive index around a central axis of a multimode fibre or around the core of a reduced mode fibre.

A theoretical treatment of increasing loss for higher order modes in conventionally fabricated optical fibres is described in A. Kumar and V. Rastogi, "Design and analysis of a multilayer cladding large-mode-area optical fibre," J. Opt. A: Pure Appl. Opt. 10, 015303 (2008). Using this analysis, higher order modes may instead be stripped off by laser modifying an existing fibre.

The method may comprise modifying a plurality of separate regions within the optical fibre, and each region may or may not exhibit distinct properties. The method may comprise forming a plurality of Bragg gratings within the fibre, and may comprise forming a plurality of Bragg gratings disposed and separated along the length of the fibre. The method may comprise writing a plurality of waveguides in the fibre. For example, the method may comprise writing multiple step index cores or in the case of a photonic crystal fibre, multiple guides formed by omitting index modification in the periodic structure. The method may comprise forming a photonic crystal waveguide comprising a photonic band gap. The periodic structure may be written using the active optical element to generate multiple beams. The method may comprise introducing an asymmetry in the waveguide to make it polarisation maintaining, e.g., a non-circular step index waveguide. The method may comprise introducing an asymmetry in an otherwise periodic structure of a photonic crystal fibre.

The method may comprise using a dry objective lens so that focussed light passed from ambient air directly into the fibre. Alternatively, an immersion medium may be used such as oil or the like.

The method may comprise any and all of the features described in relation to the first aspect of the invention.

According to a second aspect of the invention there is provided an optical fibre modified according to any and all of the features described in relation to the first aspect of the invention. The optical fibre may hence comprise any and all of the corresponding properties of the fibre formed thereby. The invention may provide a system or instrument comprising such an optical fibre.

The optical fibre may be configured by virtue of the modified region to be a single mode optical fibre and hence may allow propagation therein of only a single mode. The optical fibre may be configured by virtue of the modified region to prevent propagation therein of predetermined modes, which may be higher order modes. The optical fibre may be configured by virtue of the modified region to cause losses to predetermined modes during propagation therein. The fibre may exhibit losses of greater than 1 dB per metre, 3 dB per metre, or 10 dB per metre for predetermined modes and may exhibit such losses for all modes propagating therein except one. The optical fibre may exhibit a reduced number of modes.

The optical fibre may comprise a channel within the fibre and the modified region may be proximate a channel. The optical fibre may comprise a plurality of channels and the modified regions may be proximate those channels, and/or may be disposed between those channels. The fibre may comprise channels such as air or fluid channels. The fibre may comprise a laser modified air-hole fibre comprising a Bragg grating and/or a plurality of Bragg gratings.

According to a third aspect of the invention there is provided a method of laser modifying an optical fibre to form a waveguide at a target location within the fibre to reduce propagation of optical modes within the fibre, comprising: positioning at least a portion of an optical fibre in a laser system for modification by a laser; and laser modifying the optical fibre at the target location using the laser so as to produce the waveguide.

The method may comprise applying a correction to an active optical element of the laser system to modify wavefront properties of the laser to counteract an effect of aberration on laser focus; and laser modifying the optical fibre at the target location using the laser with the corrected wavefront properties to produce the waveguide. The correction may comprise any and all of the features of the correction described with reference to the first aspect of the invention.

The method may comprise configuring the waveguide so as to prevent propagation of all but a single mode within the fibre, and hence the method may comprise producing a single-mode optical fibre. The method may comprise writing a step-index waveguide within the optical fibre. The method may comprise writing a periodic structure waveguide. The method may comprise modifying the fibre to support (i.e. allow propagation of) fewer than a hundred modes, or fewer than 10 modes.

The method may comprise configuring the waveguide to increase losses for predetermined propagating modes. The method may comprise configuring the waveguide to cause higher order modes to experience increased losses during propagation. The method may comprise producing a waveguide within the fibre that causes a loss of greater than about 1 dB (decibel) per metre, about 3 dB per metre, or about 10 dB per metre for predetermined modes. The method may comprise modifying the optical fibre so that all but a single mode experience losses of greater than about 1 dB per metre, about 3 dB per metre, or about 10 dB per metre.

The method may comprise using a dry objective lens, and may comprise not using an oil immersion technique during the laser modification.

The optical fibre may be any suitable optical fibre. The optical fibre may be a sapphire optical fibre or a sapphire-based optical fibre, and hence the method may comprise producing a sapphire optical fibre which supports a reduced number of modes. The method may comprise producing a single-mode sapphire optical fibre.

The method may comprise any and all of the features described in relation to the first aspect of the invention. The method may comprise producing an optical fibre comprising any of the features described in relation to the second aspect of the invention.

According to a fourth aspect of the invention there is provided a laser-modified sapphire optical fibre that exhibits losses for predetermined modes. The losses may be greater than 1 dB per metre, 3 dB per metre, or 10 dB per metre for the predetermined modes. The sapphire optical fibre may exhibit such losses for all but a single mode. Thus, the sapphire fibre may comprise laser-modified regions configured to cause a plurality of modes to exhibit losses during propagation, and may cause all but a single mode to exhibit losses during propagation. The laser modified regions may comprise a waveguide configured to increases losses for predetermined propagating modes, and may be configured to increases losses for all propagating modes but one.

The laser-modified sapphire fibre may be formed by any and all of the method features described in relation to the first and/or third aspect(s) of the invention. The laser-modified sapphire fibre may hence comprise any and all of the corresponding properties of the fibres formed thereby.

According to another aspect of the invention there is provided a single-mode sapphire optical fibre.

The single-mode sapphire optical fibre may comprise bulk sapphire having a first refractive index and an optical core having a second refractive index different to the first refractive index. The bulk sapphire may have only the first refractive index, so that the optically functional part of the fibre consists of only an optical core for propagation of a single mode, and a homogeneous surrounding sapphire material.

The single-mode sapphire fibre may comprise a region of modified refractive index configured to guide light therein. The fibre may have modified regions having modified refractive indices which may be substantially solid. The modified regions may comprise modified material comprising micro-voids therein. The sapphire fibre may be a photonic crystal fibre comprising an array of modified regions. The modified regions may serve to define a light-guiding region of the sapphire fibre. The sapphire fibre may thus be configured to guide light in an unmodified region, or a modified region.

The single-mode sapphire fibre may comprise a waveguide configured to prevent propagation of all but a single mode along the fibre.

The single-mode sapphire fibre may comprise a plurality of Bragg gratings along its length and may be for measuring temperature at multiple points.

The single mode sapphire fibre may be formed using any and all of the method features described in relation to the first and/or third aspect(s) of the invention. The single mode sapphire fibre may hence comprise any and all of the corresponding properties of the fibres formed thereby.

According to another aspect of the invention there is provided a method of creating a laser written single-mode sapphire fibre.

While the correction may be applied to an active optical element so that the correction can be dynamically tailored to a specific fibre as needed, for limited laser modifications it may also be possible to apply a suitable correction using a static optical element. This requires the same correction to be suitable for all laser modifications, for example if all modifications are made to the same location of a fibre having known optical properties.

According to another aspect of the invention there is provided a method of laser modifying an optical fibre to form a modified region at a target location within the fibre, comprising: positioning at least a portion of an optical fibre in a laser system for modification by a laser; obstructing portions of a laser beam profile which would otherwise be incident off-axis of a longitudinal axis of the optical fibre so that light is incident on the optical fibre only in the plane defined by the longitudinal axis; and laser modifying the optical fibre at the target location using only the unobstructed portion of the laser beam profile to produce the modified region.

In this way, laser light which would otherwise contribute to astigmatic aberration by falling incident on a curved surface of the fibre may be prevented from reaching the fibre and causing aberration. Instead, light falls substantially only on a horizontal longitudinal section of the cylindrical surface of the optical fibre.

In one implementation, a physical slit may be inserted before the objective lens and positioned such that it is centred in the pupil of the lens, oriented in the same direction as the longitudinal axis of the fibre (the long axis of the slit along the fibre, short axis of the slit perpendicular to the fibre). The slit may be made of metal or any other material that effectively blocks the laser light. The slit width may be dependent on the objective lens used, but may be in the range of 0.4 mm to 1 mm. This limits the locations of the light intersecting the fibre and thus limits the astigmatic aberration when focusing inside the fibre core. As a side effect, this approach may additionally reduce the numerical aperture of the objective lens in the direction perpendicular to the fibre axis, thus spreading the focal intensity in that direction for a greater coverage of the fibre core.

The slit may limit the astigmatic aberration and transform the focus into a disc. The dimension of the disc perpendicular to both the fibre axis and the optical axis of the objective lens is dictated by the width of the slit perpendicular to the fibre axis. The dimensions of the focal disc in the other two orthogonal directions are dictated by the length of the slit along the fibre axis. The slit width and length may be adjusted to control the size of the focal disc within the waveguide core for optimum coverage.

The effect of using a slit in front of the objective may be to generate a strip illumination of the objective lens pupil. This may be achieved using other optical methods than a physical slit. For example, an adaptive slit illumination may be generated using an adaptive optical element that only directs a portion of the light incident on it toward the objective lens. This has the benefit that the active optical element may also be used for further fine aberration correction, particularly if the focal disc is not situated within the fibre core. The method may comprise using other fixed optical elements, such as a cylindrical lens, to generate a strip illumination of the objective lens.

The slit may be positioned as close as possible to the objective lens to reduce the effects of diffraction. The slit may be oriented perpendicular to a longitudinal axis of the optical fibre, which may also remove or reduce the effects of aberration on the laser focus. Then, the focal intensity may spread along the axis of the fibre, such that it may not be suitable for short pitch gratings but may be useful for long pitch gratings.

References herein to single-modes are intended to include single modes comprising multiple polarisation states. References herein to modes are intended to include modes comprising a predetermined wavelength or range of wavelengths.

Although separate aspects of the invention are presented above, it will be appreciated that features described with reference to a particular aspect may be used in combination with any of the aspects as needed.

LIST OF FIGURES

Exemplary embodiments of the invention will now be described by way of example only and with reference to the accompanying drawings in which:

FIG. 1 shows an optical fibre comprising a fibre Bragg grating;

FIGS. 2A and 2B schematically show perpendicular views of light focussing from a lens in a fibre without aberration correction, the focussing occurring at different depths because of different degrees of refraction from different parts of the fibre;

FIG. 3 shows a schematic of a system for laser modification of a fibre;

FIGS. 4A and 4B schematically show perpendicular view of light focussing from a lens in a fibre with aberration correction, the focussing occurring at the same depth despite different degrees of refraction from different parts of the fibre;

FIG. 5A schematically shows an example of spherical aberration distorting a focus of a laser without aberration correction;

FIG. 5B schematically shows an example of reduction of spherical aberration achieved by applying aberration correction to the laser entering the objective lens;

FIGS. 6A, 6B and 6C show various foci within a fibre optical core;

FIG. 7 schematically shows a fibre comprising multiple optical interfaces through which a laser focusses;

FIG. 8 schematically shows a fibre comprising a plurality of optical cores;

FIG. 9 schematically shows a fibre comprising a pair of air channels;

FIG. 10 schematically shows a photonic crystal fibre comprising a periodic array of holes;

FIGS. 11A and 11B schematically show perpendicular views of a sapphire fibre;

FIGS. 12A and 12B schematically show perpendicular views of a sapphire fibre comprising an optical core and a fibre Bragg grating within that core;

FIGS. 13A and 13B schematically show perpendicular view of a photonic crystal sapphire fibre with a fibre Bragg grating;

FIG. 14 schematically shows a sensor system comprising a series of fibre Bragg gratings;

FIGS. 15A and 15B schematically show a photonic crystal sapphire fibre with a periodic laser modified regions and a laser inscribed fibre Bragg grating;

FIGS. 18A and 18B show perpendicular view of a mode converter FIG. 18C shows the fibre from the end;

DETAILED DESCRIPTION

One problem faced when focusing inside optical fibre e.g. with a dry lens is optical aberrations. Light is refracted at a boundary between air and fibre according to Snell's law. The cylindrical geometry of the fibre is not well matched to focussing with conventional (spherical or aspheric) lenses, such that different rays of light are refracted by different amounts leading to focal distortion. The distortion means a spreading of the light intensity distribution at the focus such that it is no longer at the diffraction limit. This amounts to a loss of resolution and efficiency. For fibres with a cylindrical geometry, the aberration is primarily astigmatism for a focus at the centre of the fibre cross-section (with some spherical aberration at higher focussing numerical aperture).

Figure 2B:
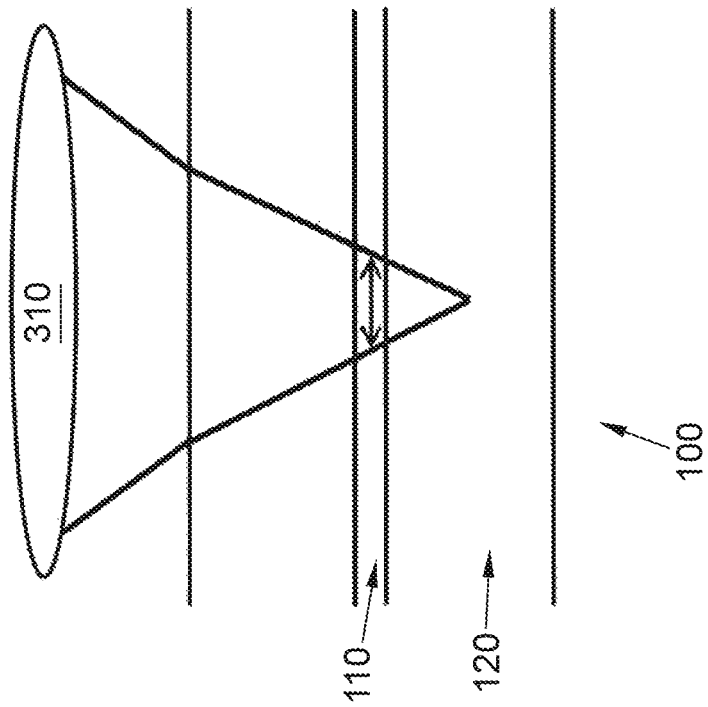
Figure 2A:
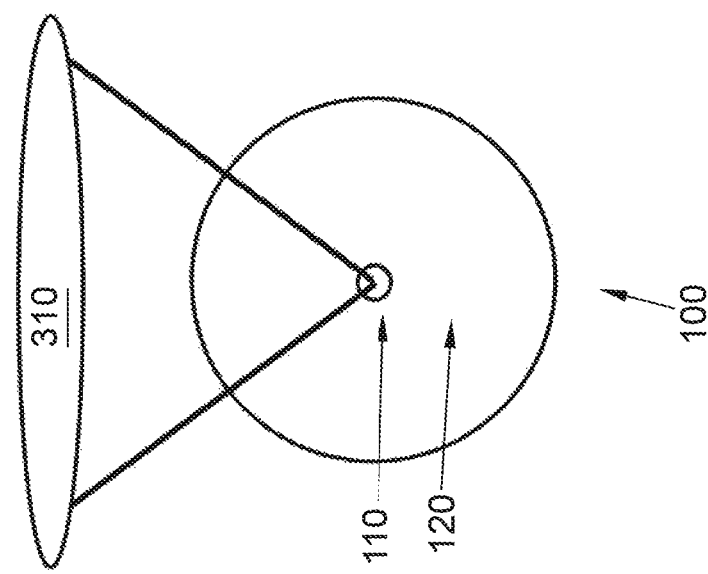

When focusing at other points inside the fibre cross-section, other aberration modes become important, notably coma. The aberration arising from the cylindrical geometry is illustrated in FIGS. 2A and 2B. The axial plane shown in FIG. 2B exhibits refraction from light focussed through the objective lens 310, but the radial plane shown in FIG. 2A does not. This results in an astigmatism in which the two planes focus at different depths, such that if the radial plane is focussed at the core 110, the axial plane will be out of focus causing an elongation along the length of the fibre 100. This is undesirable as a high precision is required in this direction to enable short grating pitches. Typical grating pitches would be around 530 nm for a Bragg wavelength around 1550 nm in silica (which has a refractive index of ~1.45). However the pitches are shorter for shorter wavelengths or if high refractive index fibre is used (e.g. sapphire has a refractive index of ~1.75).

A limited correction may be implemented using e.g. a pair of static cylindrical lenses to correct for astigmatism in optical fibre. However there is a limit to the correction possible with static lenses and such devices exhibit strong polarisation dependency of 2.2 dB.

EXAMPLE

Figure 3:
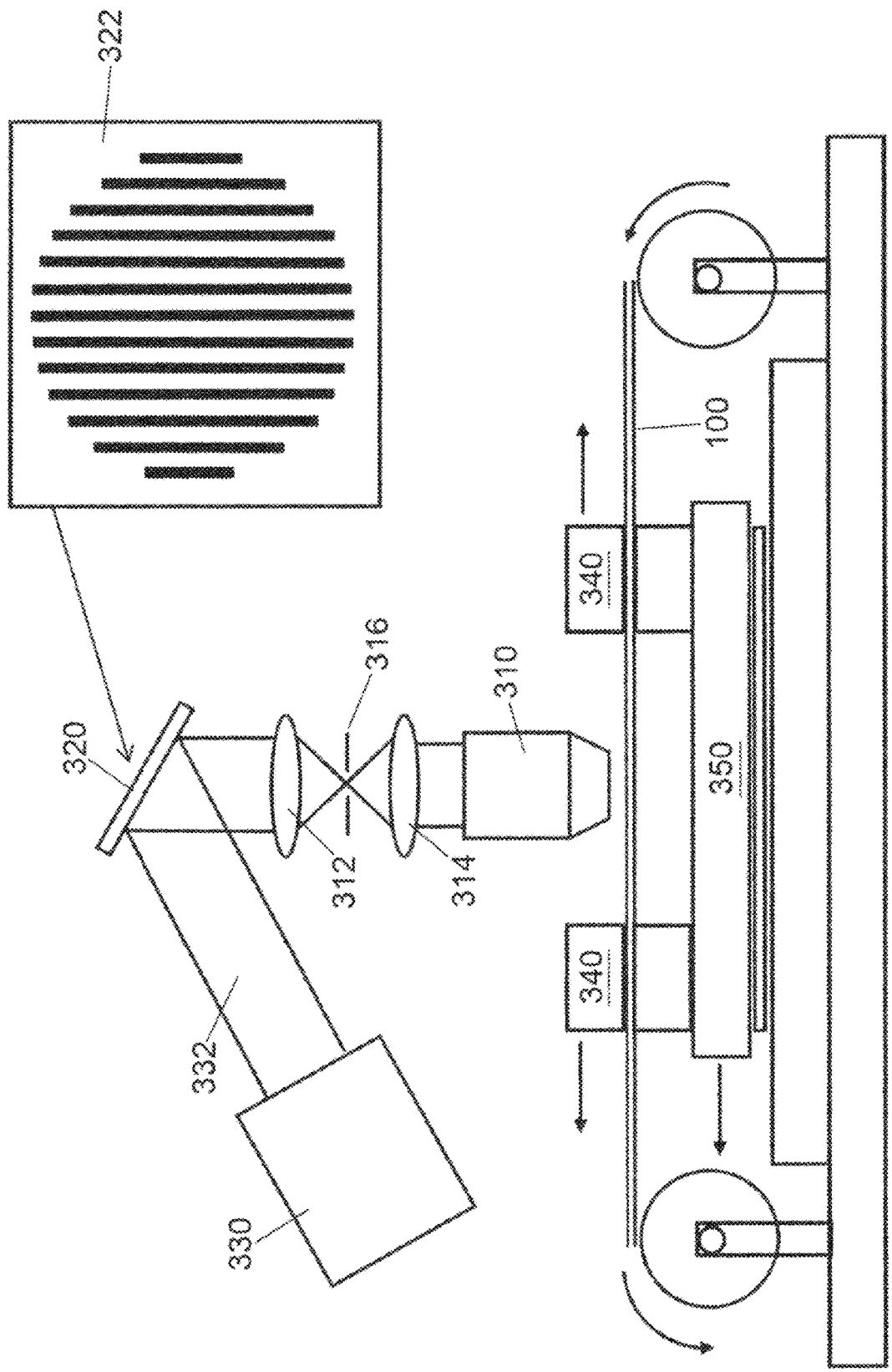

The present technique implements focusing inside optical fibre using e.g. air-based lenses using an adaptive optical element (AOE) 320 to correct for the aberrations, as shown in FIG. 3. A liquid crystal spatial light modulator (SLM) may be used to control the phase of the light when focusing inside the fibre. An example of the display 322 of the adaptive optical element 320 is also shown. Other AOEs exist and could be used. For example, membrane deformable mirrors and segmented deformable mirrors could also be used. Other AOEs could be used, provided they have the means to modulate the phase of light with spatial resolution.

A laser 330 is arranged to illuminate the active optical element 320 with a laser beam 332, which AOE imparts on the laser beam's profile a predetermined phase by the configuration of the display 322. The beam 332 passes through lenses 312 and 314 and via an aperture 316 to the objective 310, which focusses into the fibre 100.

The fibre 100 is held in V-groove clamps 340 under tension. The fibre 100 is moved on an air bearing stage 350 and there may be means to pull the fibre 100 through so that FBGs 114 may be written at multiple points along the fibre length using the laser 330. The bearing stage 350 may be arranged to move the fibre 100 in other dimensions (e.g. a transverse dimension) in order to aid in positioning the laser focus at a desired location within the fibre—e.g. off-axis of the fibre. Instead of moving the fibre 100, it is possible keep the fibre 100 stationary and move the focussing optics along the fibre length, or change the display 322 of the active optical element 320 to move the focus of the laser.

In order to write FBGs, the laser 330 is focussed within the centre of the fibre core 110. The stage 350 is set to a defined velocity and the laser 330 fires pules of laser light with a defined repetition rate and pulse energy. This results in a series of modifications 112 longitudinally along the fibre core 110 with a different refractive index having been modified by the laser pulses to give an FBG 114. By controlling the stage velocity and/or pulse repetition rate, the pitch of the FBG 114 may be varied and hence the Bragg reflection wavelength may be varied. By controlling the pulse energy, the grating strength may be controlled. Higher pulse energy may be used to create higher refractive index changes and stronger coupling coefficients for the FBG 114. It is desirable to control the FBG 114 coupling coefficient, such that it is tapered down to zero at the grating edges, rather than have a "flat-top" profile in grating strength. This is known as apodisation and has the beneficial effect of reducing side-lobes in the grating reflectivity spectrum which would otherwise occur. There are many different designs of FBGs 114 which can be used. The simplest is a uniform pitch which will reflect at a specific wavelength. If the velocity is varied during manufacture a chirped grating can be written which has a broader wavelength spectrum and which exhibits dispersion. There are many other types, for example sampled gratings and Moire gratings.

The method described here is illustrated using a femtosecond infra-red fabrication laser to modify the fibre, but the techniques may be applied to fabrication systems of any wavelength or any pulse width. For example, ultraviolet (UV) and continuous-wave (CW) systems can be used. Typically the fabrication laser induces an increase in refractive index of the optical fibre. However in some materials the laser may induce a decrease in refractive index. The optical devices manufactured will typically operate at a different wavelength to the writing laser. Devices may be manufactured for any operating wavelength the optical fibre supports. The optical fibre does not have to be single mode at the operating wavelength it is used at.

The shape and composition of the fibre is relevant for the correction of aberrations when focusing inside the fibre. If these characteristics are known a priori, then the fabrication can be carried out with predictive aberration correction. If the shape is not known, optical measurements based upon the location of the fibre surface can be made to ascertain the shape. Then predictive aberration correction can be implemented by determining a correction based on the shape of the fibre 100. If the composition (including the refractive indices of constituent materials) of the fibre 100 is not known, a focal feedback measurement may be used for accurate aberration correction. This may be done by e.g. exciting non-linear photoluminescence within the fibre 100, or by using light emission from plasma at the laser focus during fabrication. Both of these are maximised when the aberration is minimised. Alternatively, the strength of the fabrication may be used to infer the optimum aberration correction. For these schemes to work effectively, it may also be necessary to use aberration correction for imaging inside the fibre. Once the aberration has been characterised for a class of fibre, it is possible to subsequently use a look-up table before fabrication for the aberration correction for that class of fibre.

Figure 5B:
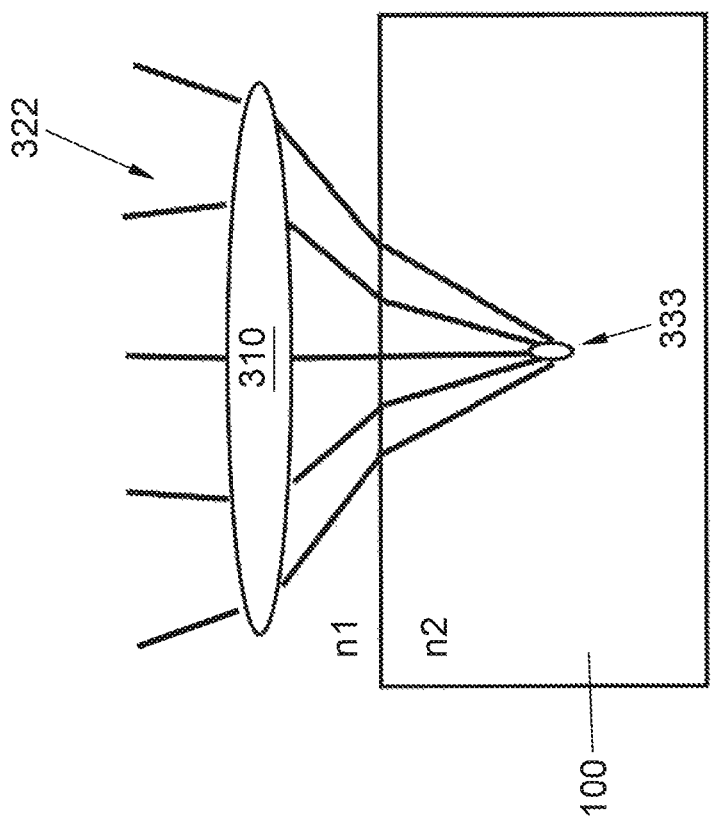
Figure 5A:
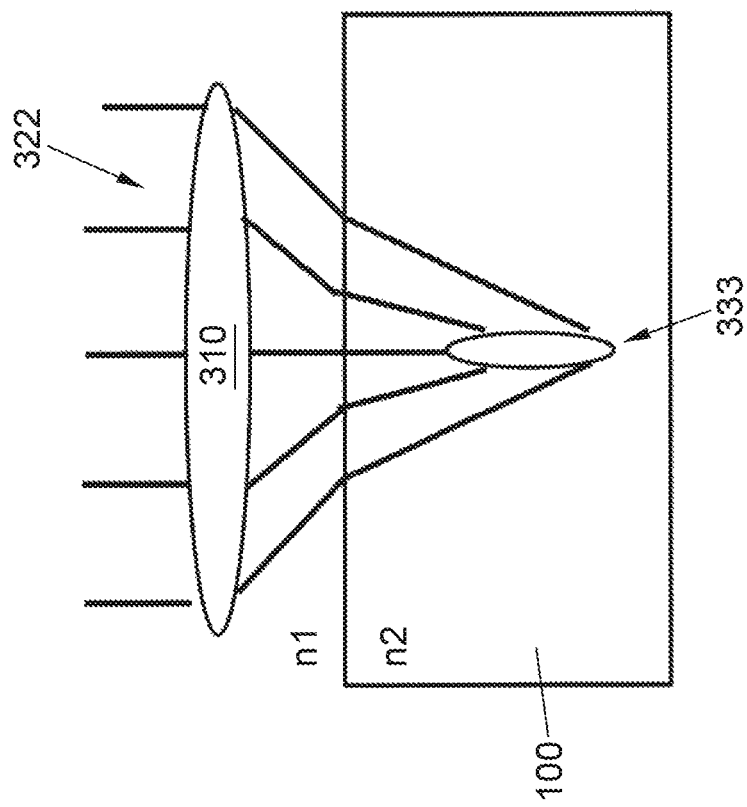

The aberration is expected to be dominated by astigmatism for cylindrical silica fibres, FIG. 4 shows the case where the astigmatism of FIG. 2 has been corrected. In the radial plane shown in FIG. 4A, the light focussed by the lens 310 is incident in the core 110, and in the axial plane shown in FIG. 4B the light is also focussed in the core 110. For cylindrical fibres 100 with high refractive index or using an objective lens with an NA above 0.7, there will additionally be some spherical aberration which may be compensated via the correction. FIG. 5A shows the spherical aberration caused by the interface between media of differing refractive indices n1 and n2. The uncorrected laser beam 332 has a flat wavefront and hence has parallel light rays. Once focussed into the fibre 100, the light rays experience spherical aberration and the resulting focus 333 is distorted from its ideal diffraction limited size. FIG. 5B shows the case when the spherical aberration is corrected by changing the phase profile of the laser beam 332. The light rays of the corrected wavefront are no longer parallel, but once focussed within the fibre 100, they result in a focus 333 which is more efficient than that of FIG. 5A, and hence has a greater Strehl ratio.

The described technique can also accommodate fibres with non-circular/cylindrical geometry, such as a rounded hexagonal sapphire fibre. In such an implementation, the phase in the pupil of the objective lens 310 may be segmented and a different phase correction applied to each ray depending on which facet of the fibre that ray intersects.

Figure 6C:
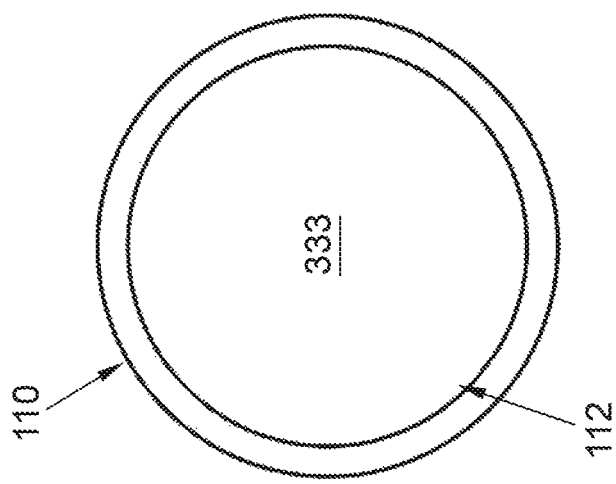
Figure 6B:
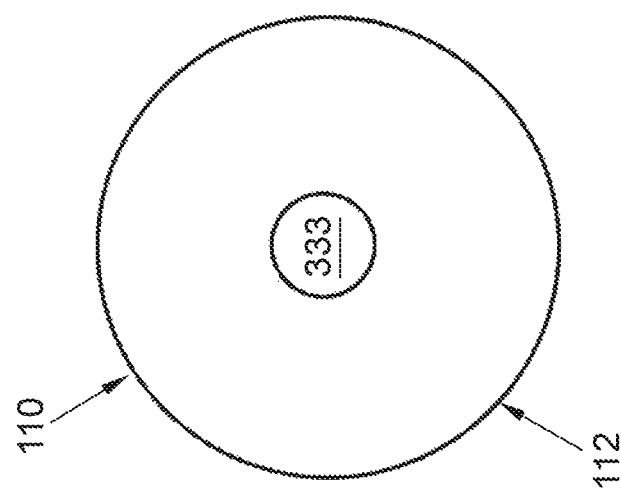
Figure 6A:
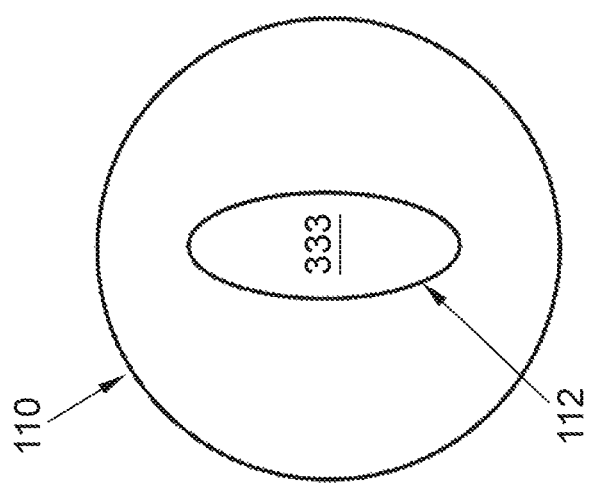

FIG. 6A shows an elliptical focus 333 in the fibre core 110 that could create a modified region 112 which would give rise to coupling into cladding modes of the fibre 100. The elliptical focus arises because of diffraction and aberration may make the focus less elliptical by distorting it. The adaptive optics of the laser system may be used to precisely shape the beam focus 333 to a small point as per FIG. 6B. Moreover, using a high NA lens and applying both aberration correction and beam shaping corrections to the AOE 320, the focus 333 can be shaped to generate a uniform disc-shaped focus over the whole core 110.

Figure 7:
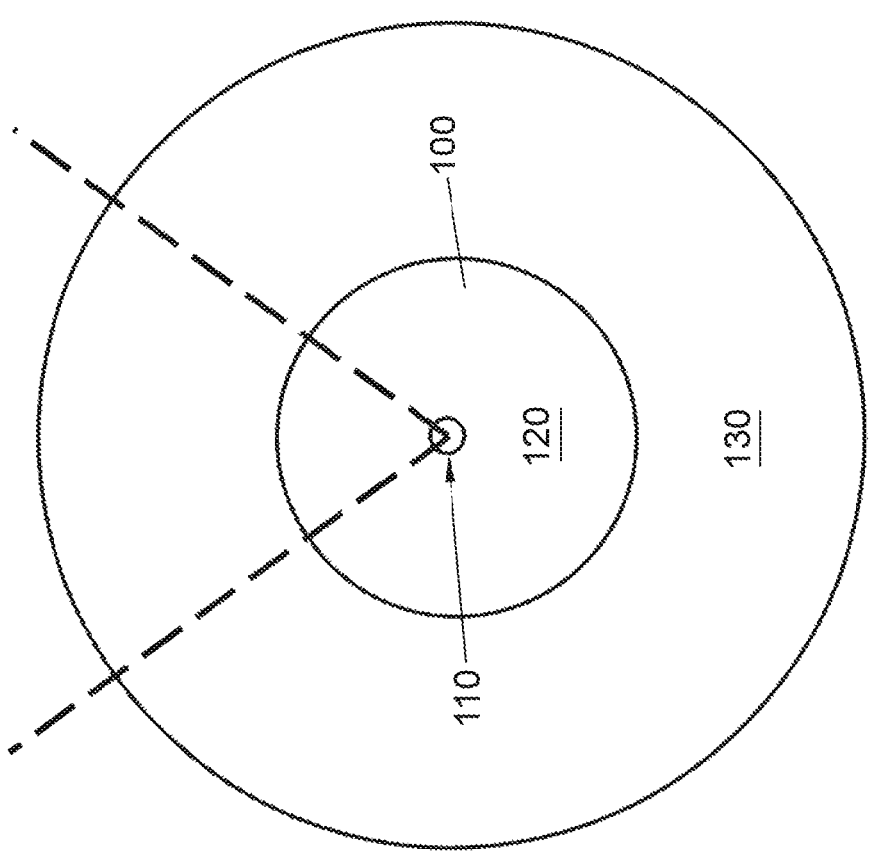

In order to write an FBG 114 in optical fibre 100, it is normal to remove the primary coating 130 that is present and re-coat the fibre 100 after the FBG 114 has been made. The primary coating 130 is typically 200-250 µm in diameter and is made of polymer (e.g. polyacrylate) and hence typically has a different refractive index to the fibre 100. Such removal and re-coating makes the manufacture process more time consuming and expensive. It also reduces the mechanical strength of the fibre 100. The disclosed method avoids the need to remove the coating 130 by allowing focussing through it, in order to write in the fibre 100. However, the additional interface between coating 130 and the surrounding air results in further optical aberration of the focus in the fibre 100. FIG. 7 shows a cross-section of the fibre 100 with the primary coating 130. By applying appropriate aberration correction the AOE 320, the aberration associated with refraction at the interface between the primary coating 130 and the surrounding air can be compensated, together with the aberration associated with refraction at the interface between the primary coating 130 and the cladding 120. Note that the dashed lines in the image do not show light rays but rather indicate a schematic envelope of the light focussed by the lens.

Figure 8:
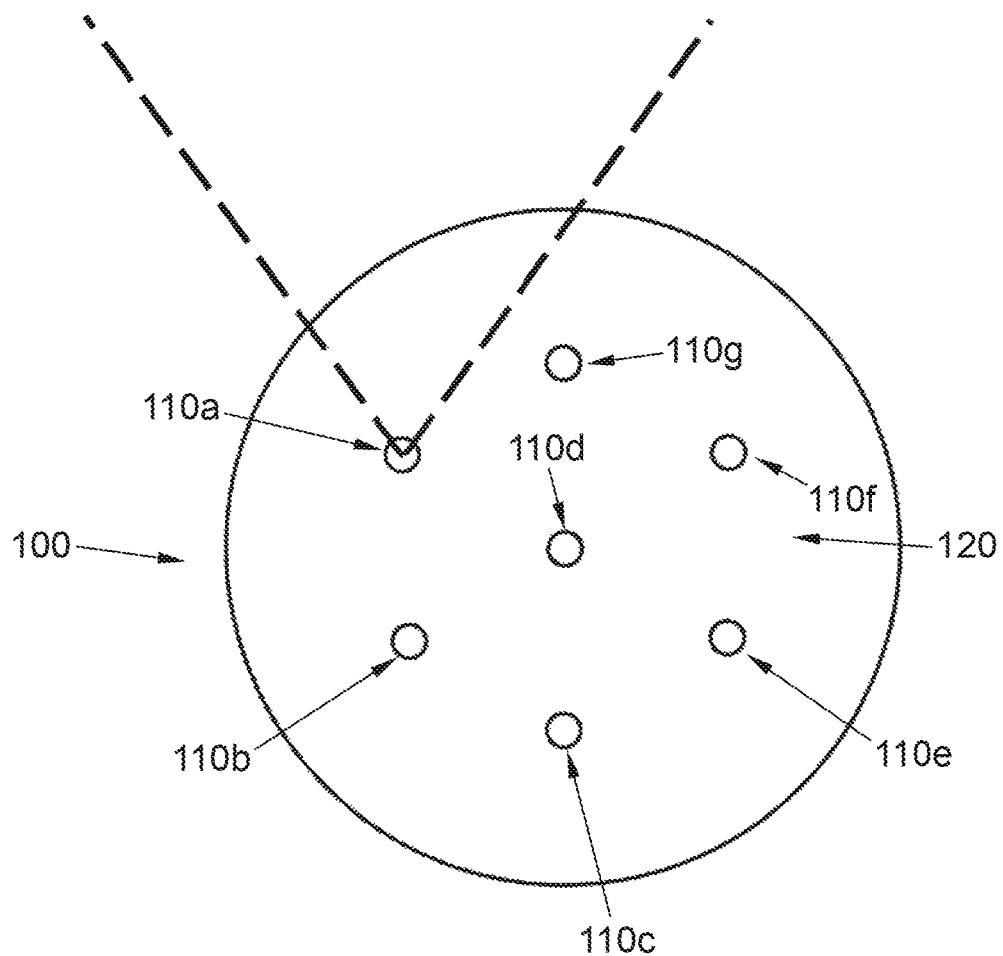

FIG. 8 shows a multicore fibre 100. Multicore fibres have multiple cores 110*a-g* in a single cladding 120. They allow a number of communication channels to be present in a single fibre 100. This has benefit for increasing the capacity of communications channels in a single fibre. They also have application in optical fibre sensors. The present technique can be used to write FBGs 114 in one core 110 without affecting the other cores 110. It can also be used to write different FBGs 114 (e.g., FBGs 114 at different wavelengths) in different cores present at the same longitudinal point along the fibre 110. Writing off-centre in the fibre 100 results in a more severe aberration, which can be corrected by the correction applied to the AOE 320. As can be seen in FIG. 8, to write in different cores of the fibre the writing beam may have to propagate through interfaces of different cores 110, so the aberration affecting the resulting focus 333 will be different. That is, the writing position within a cross-section of the fibre is different for different cores, and hence different aberration modes will be dominant for writing therein. For example, the dominant aberration mode in the central core 110d may be astigmatism, whereas cores which are off-centre may have a non-symmetrical air/cladding interface and hence have aberrations dominated by other modes e.g. coma. Core 110a may require a greater correction to coma aberration than would core 110d. Core 110f may require an opposite correction to coma than would core 110a etc. When writing in different cores, each core will require a different pattern on the active optical element to compensate for the different interfaces (e.g. air/coating interface if using a coated fibre).

The correction applied to the AOE 320 can be dynamically changed so that as the FBG 114 is written in each core 110, the correction is changed to match the aberration relevant to that particular core 110.

A feature of the dynamic optics is that it allows multiple writing beams simultaneously. A series of beams may be generated, each focussed on a different core 110 and each with different aberration correction applied thereto as appropriate. In a sensor system, FBGs 114 in a multicore fibre could be used as a form of spatial multiplexing to allow more sensor channels to be multiplexed onto a single fibre 100.

Figure 9:
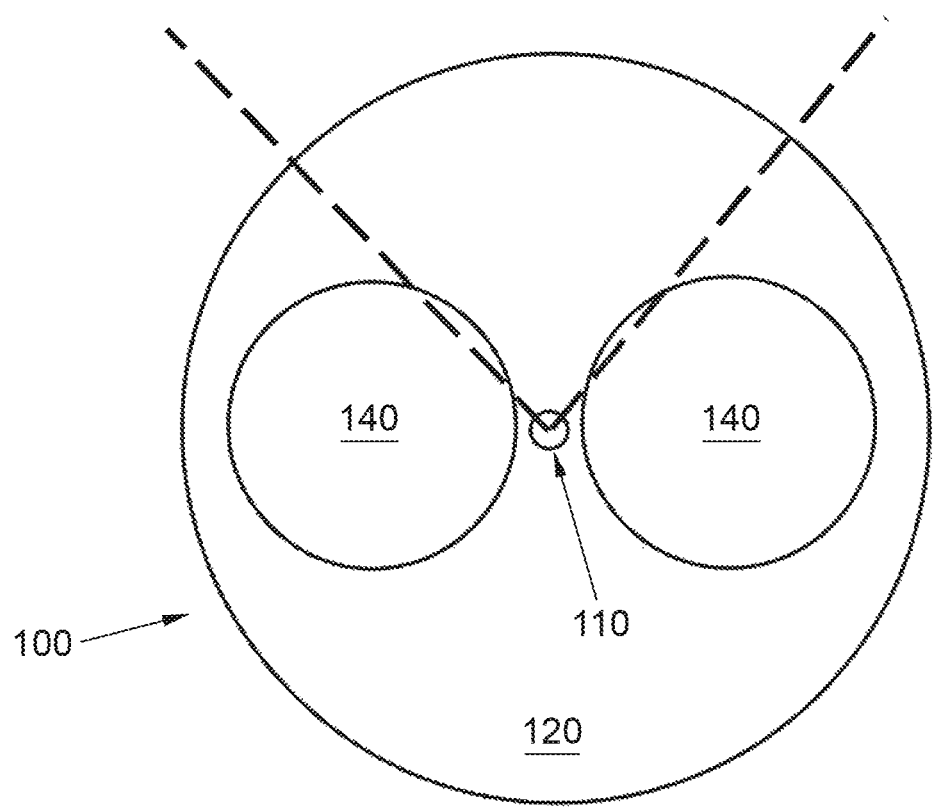

FBGs may also be written in polarisation maintaining fibre (described below). This results in two reflection peaks as the two orthogonal polarisation modes have different effective refractive indices and hence different Bragg wavelengths. FIG. 9 shows a fibre 100 comprising air holes 140. Air hole fibres have birefringence associated with the asymmetry caused by the air holes 140. They can be used as pressure sensors. As the pressure increases, the asymmetry increases causing the two polarisation modes to move further apart in wavelength. However to write a grating in such a fibre, there is an additional air/fibre interface to overcome within the fibre 100. The present technique may be used to counteract the additional refraction and hence aberration that arises as a consequence of the extra air/fibre boundaries.

Figure 10:
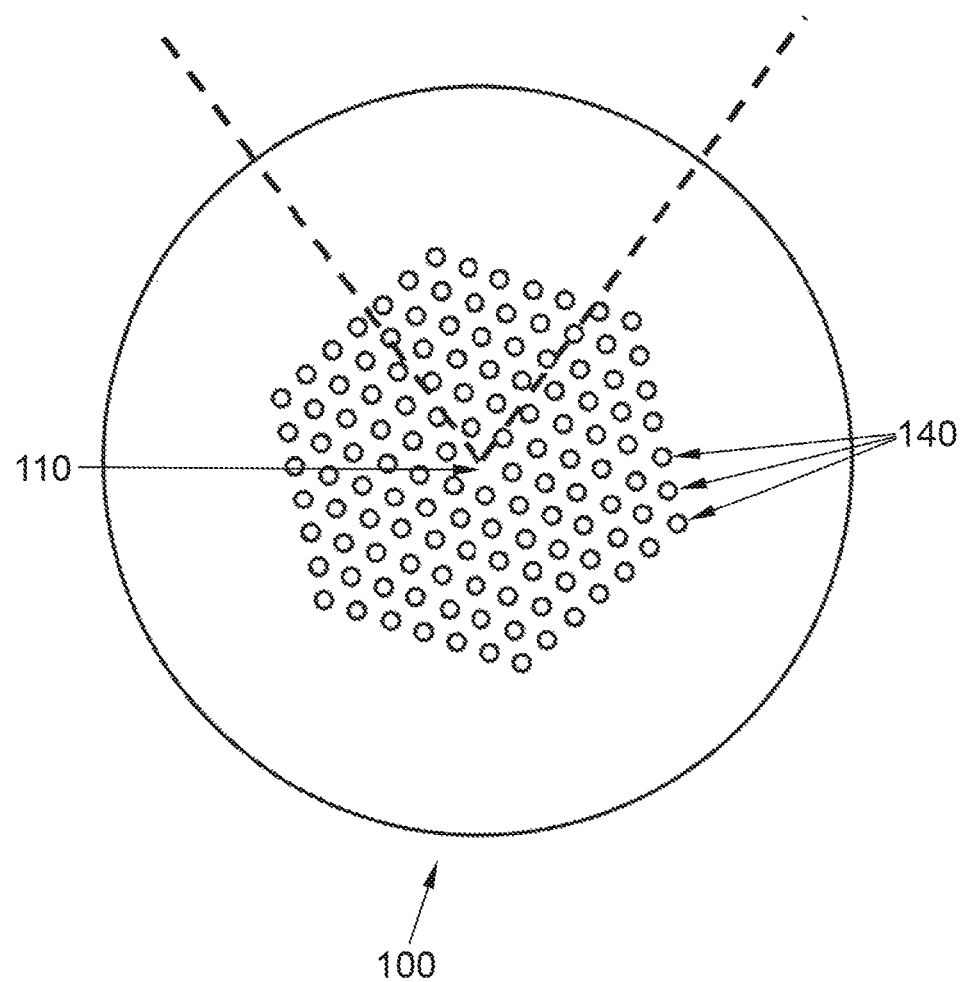

FIG. 10 shows a photonic crystal fibre 100. This fibre has a periodic array of holes 140. The light is guided in the central region. The fibre may have a solid core 110 (as illustrated) or a hollow core. In order to write an FBG 114 in this fibre 100, the aberration for the periodic structure is compensated by the correction applied to the AOE 320.

FIGS. 11A and 11B show a sapphire fibre 100. Sapphire fibres can withstand temperatures up to 2000° C. They are also radiation resistant. However, the aberration is very severe as sapphire has a high refractive index (~1.75) and the resulting spherical aberration is greater. Sapphire fibres often also have a rounded hexagonal cross-section, complicating the aberration correction. The sapphire fibre 100 does not have a core, but instead light is guided by the interface of the high index material and the surrounding medium. It has a relatively wide diameter (e.g. 400 µm or 250 µm) and is therefore very multimode. The present technique can be used to fabricate a single mode fibre within the sapphire fibre 100.

Instead of writing discrete points along the length, the laser beam is moved more slowly to change the refractive index along a continuous line. This effectively creates a core 110 within the fibre 100 within which light can be guided. An FBG 114 can then be written on top of the written core 110. This is shown in FIGS. 12A and 12B. It is also possible to write multiple cores 110 in the sapphire fibre 100 to create a multicore sapphire fibre 100. Different FBGs 114 can also be written into different cores 110 as above.

FIG. 13 shows a photonic crystal sapphire fibre 100 with an FBG 114. Here a photonic crystal waveguide is formed. However instead of holes, there is a periodic array of index modifications 112 over the cross-section to achieve a similar effect. Parallel writing beams could be used to write multiple regions 112 simultaneously. FBGs 114 can also be written in this fibre 100.

Figure 14:
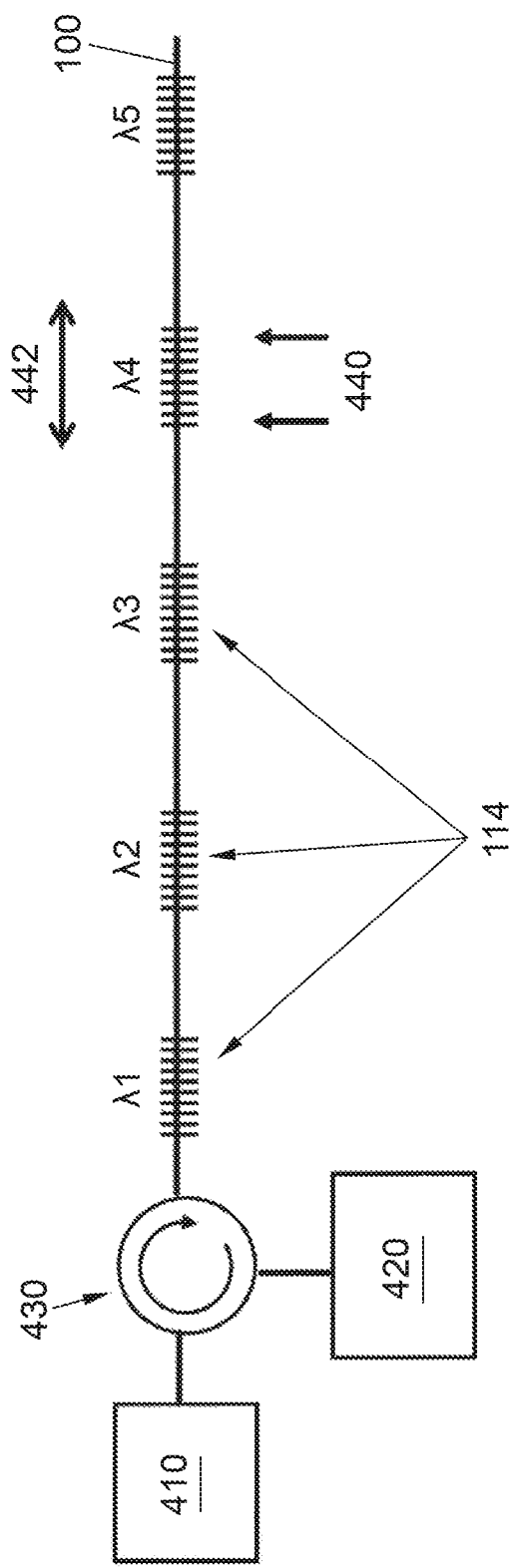

FIG. 14 shows an example sensor system incorporating FBGs 114 written using the present technique. In this example each FBG 114 has a different centre wavelength, so that a number of FBGs 114 can be multiplexed and distinguished from one another. The wavelength separation is large enough so that at the extremes of the sensor range the response from one FBG 114 will not overlap the spectral region of another. In addition or instead of, the FBGs 114 may be distinguished via time-of-flight difference by transmitting pulses of light to interrogate them. Light from a light source 410 is directed to an array of FBGs 114 using an optical circulator 430. The light reflected back from the FBGs 114 is then interrogated by a light detector 420 to determine the wavelength of each FBG 114 and hence its stain and/or temperature. Changes in strain and/or temperature—e.g. as shown by arrows 440 and 442—will affect the pitch of FBGs and hence their reflected wavelengths.

Sapphire optical fibre is multi-mode, though attempts have been made to create single-mode sapphire fibres. For example, in Cheng et al., "Design and analysis of large-core single-mode windmill single crystal sapphire optical fiber", Opt. Eng 55(6), 066101, June 2016, a "windmill" fibre is proposed (though not actually fabricated) which has holes coming from the side towards the core in a radially symmetric arrangement. This fibre results in the higher order modes having higher loss, such that they are stripped away. However it is not truly single-mode in that higher order modes are still present (see FIG. 3 of Cheng et. al.). Bending of the fibre may induce coupling from the fundamental mode to higher order modes which are subsequently attenuated, thereby resulting in high loss.

FIG. 12A shows a step index single mode optical fibre. The condition for single mode operation is V<2.4, where V is the normalised frequency. V is defined as $$V = \frac{2\pi a}{\lambda}\sqrt{n_1^2 - n_2^2}$$

where a is the core radius, $\lambda$ is the wavelength of operation, $n_1$ is the core refractive index and $n_2$ is the cladding refractive index. Sapphire has a refractive index of around 1.75. For example, to be single mode at 1550 nm, with an index modification of 0.005, the core radius should be less than 4.47 µm (diameter less than 8.94 µm).

Figure 15:
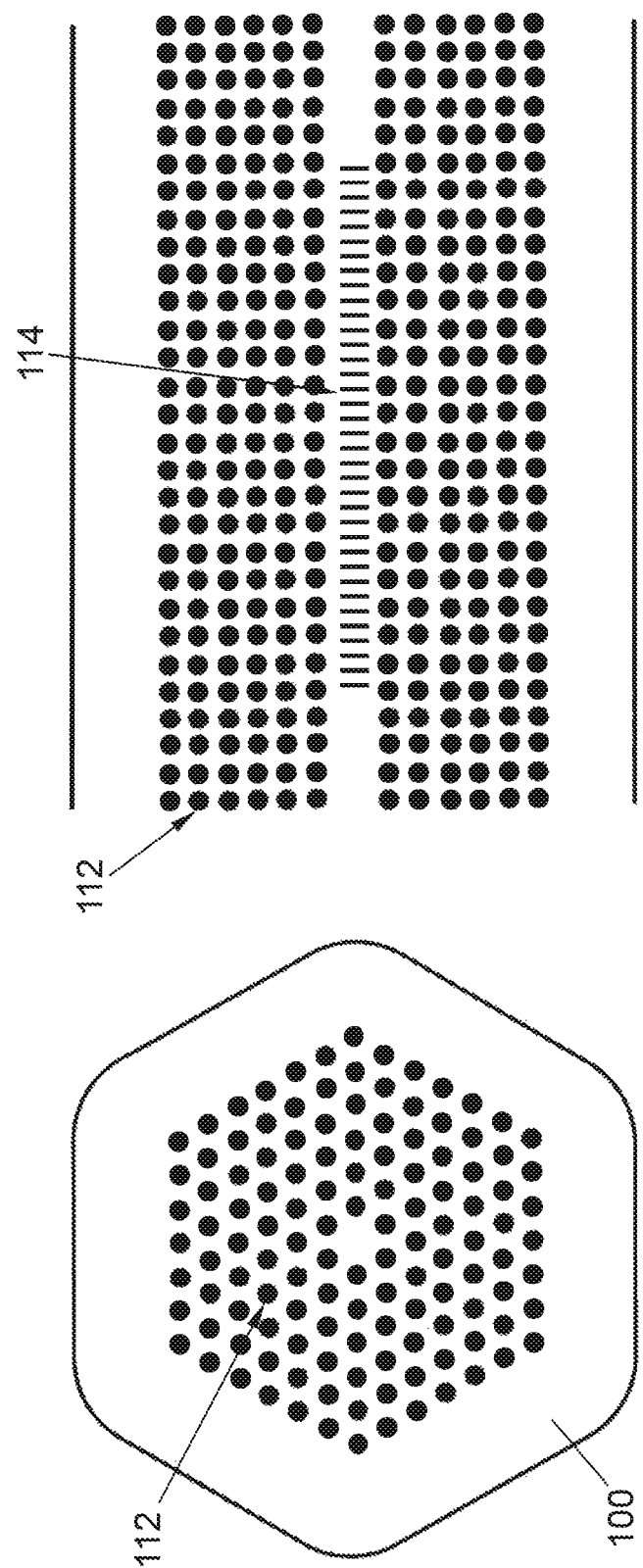

FIGS. 15A and 15B show a photonic crystal sapphire fibre 100 with an FBG 114 inscribed by laser writing and periodic structures 112 inscribed to act as a waveguide. This is similar to that shown in FIG. 13 except that the photonic structure is periodic in 3 dimensions. There is therefore a periodic array of points (or spheres etc.) with modified refractive index.

Figure 16:
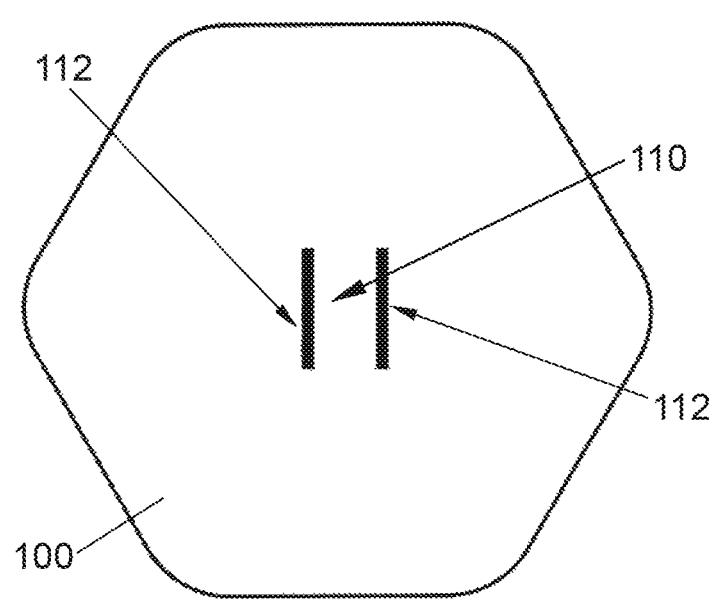
FIG. 16 shows a single mode sapphire optical fibre comprising laser written tracks.

FIG. 16 shows a single mode sapphire optical fibre which has been fabricated by laser writing tracks 112. This induces a localised stress between the tracks 112, modifying the refractive index in the central region, thereby enabling light to be guided in this region so that it functions as a core 110.

The laser writing technique is not restricted to writing FBGs and waveguides. There other devices which may be fabricated, of which some examples are described below.

Figure 17:
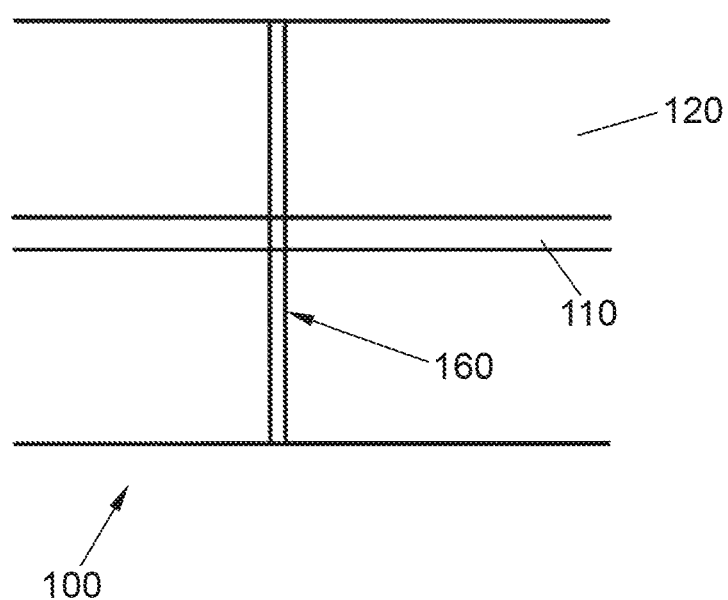
FIG. 17 shows a fibre with a microchannel running transversely through a core.

FIG. 17 shows a fibre 100 with a microchannel 160 running transversely through the core 110. A fabrication procedure for such a fibre is described in Y. Lai et al. "Microchannels in conventional single-mode fibers", Optics Letters. Vol, 31, No, 17, 2006. However, they were significantly affected by optical aberration requiring immersion oil and a glass slide. The present technique may be used to correct the aberration using a dynamic optics approach. The procedure may comprise: 1) inscribe the channel with an aberration-corrected femtosecond laser; 2) etch the fibre in a solution of 5% hydrofluoric (HF) acid, assisted by an ultrasonic bath. The HF acid preferentially removes the material from the regions in which the fibre has been inscribed.

FIG. 18 shows a fibre 100 providing an exemplary mode converter comprising a core 110 and cladding 120. For example there is a mode-mismatch when coupling between optical fibres of different sized cores or coupling between different refractive index materials. FIGS. 18A and 18B show the cross section through orthogonal sides. FIG. 18C shows the fibre from the end. The changing shape of the core 110 provides for a mode transition 116.

Figure 19B:
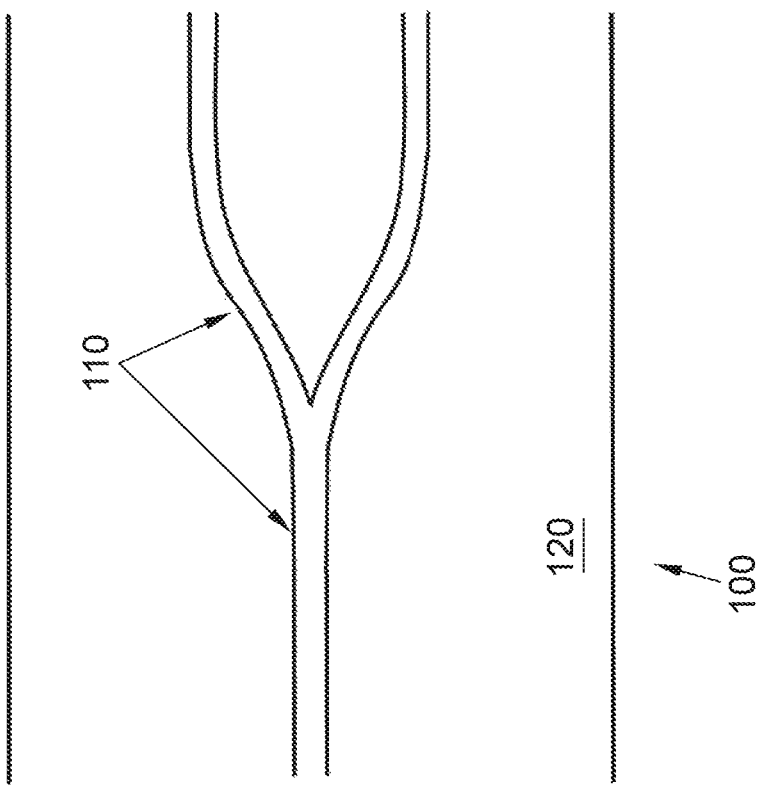
FIGS. 19A and 19B show exemplary couplers with laser written cores.
Figure 19A:
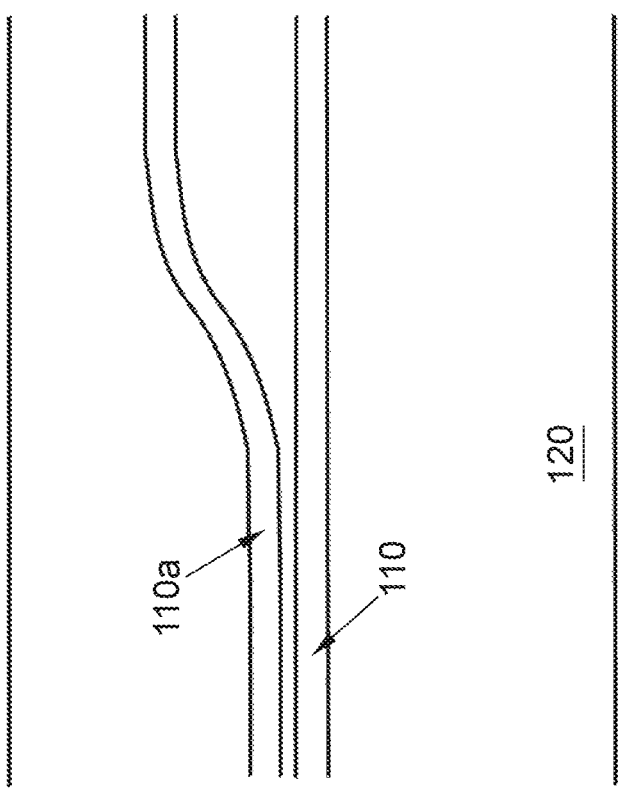

FIGS. 19A and 19B show fibres 100 providing exemplary couplers. FIG. 19A is a step index optical fibre which had a first core 110 when originally fabricated. Into this fibre a new core 110a has been inscribed. This new core 110a is in close proximity to the original core 110, so that light couples into it via evanescent coupling. The new core 110a then diverges from the original core 110. FIG. 19B is an exemplary coupler fabricated in an optical fibre 100 which did not originally have a core. A Y-coupler has been fabricated with direct laser writing.

Figure 20B:
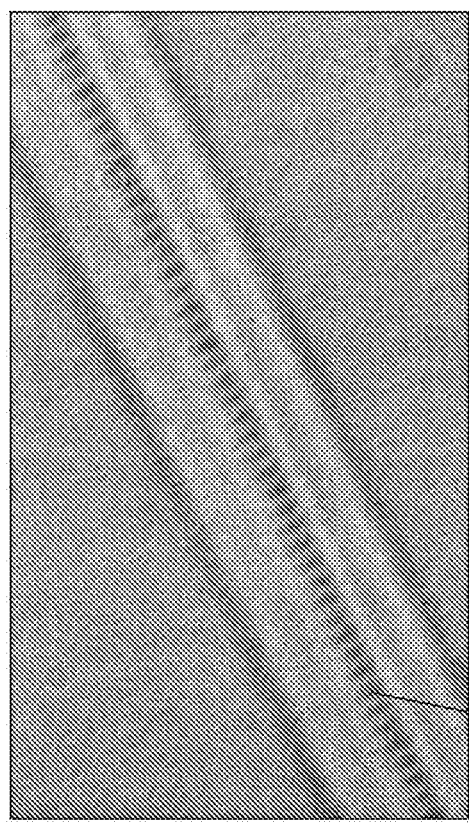
FIG. 20B shows a fibre Bragg grating laser written using aberration correction.
Figure 20A:
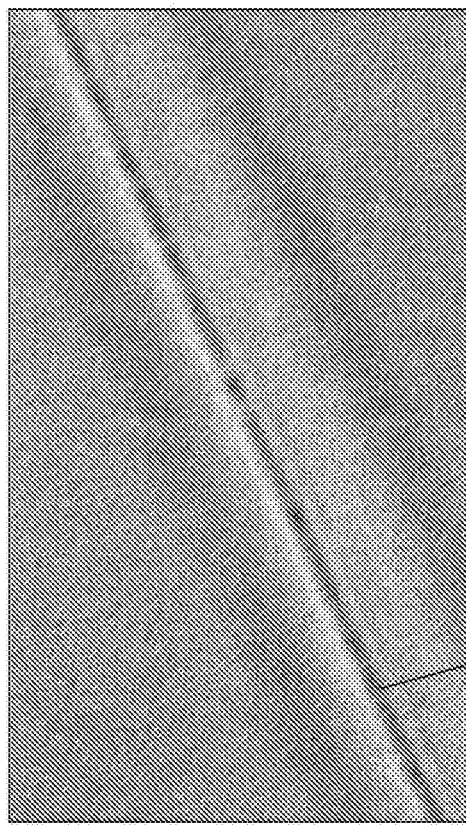
FIG. 20A shows a fibre Bragg grating laser written without using aberration corrections.

FIGS. 20A and 20B show microscope images of FBGs 114. FIG. 20A shows the case without aberration correction and FIG. 20B shows the case with aberration correction. The FBG laser written using aberration correction has better defined features.

Figure 21:
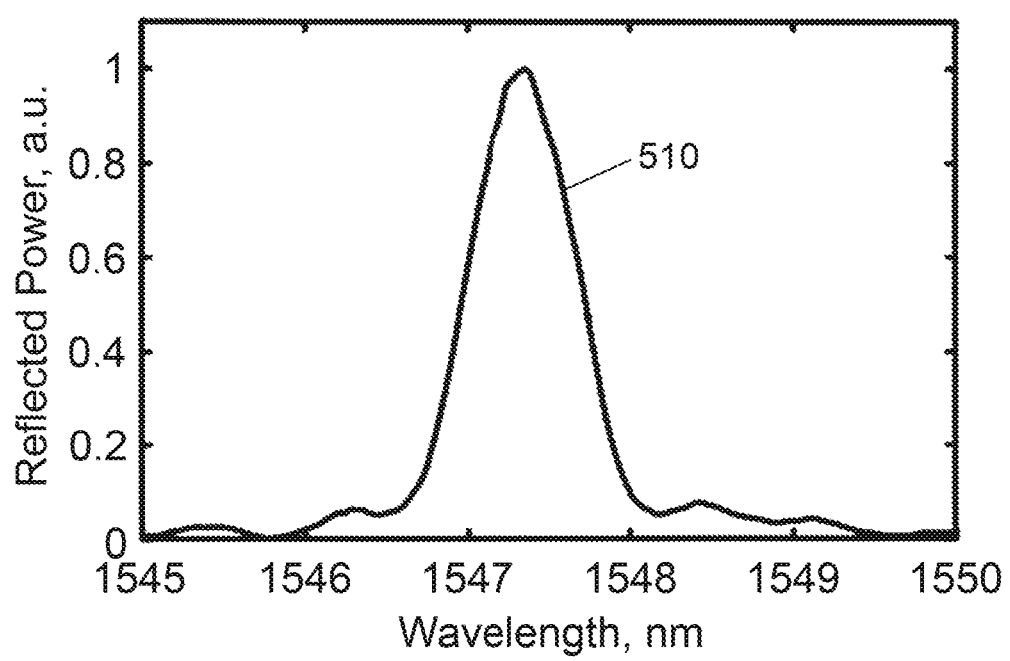
FIG. 21 shows a reflection spectrum from a fibre Bragg grating written using aberration correction.

FIG. 21 shows a measured reflection spectrum 510 from an FBG 114 written with the process of the present technique.

Figure 22:
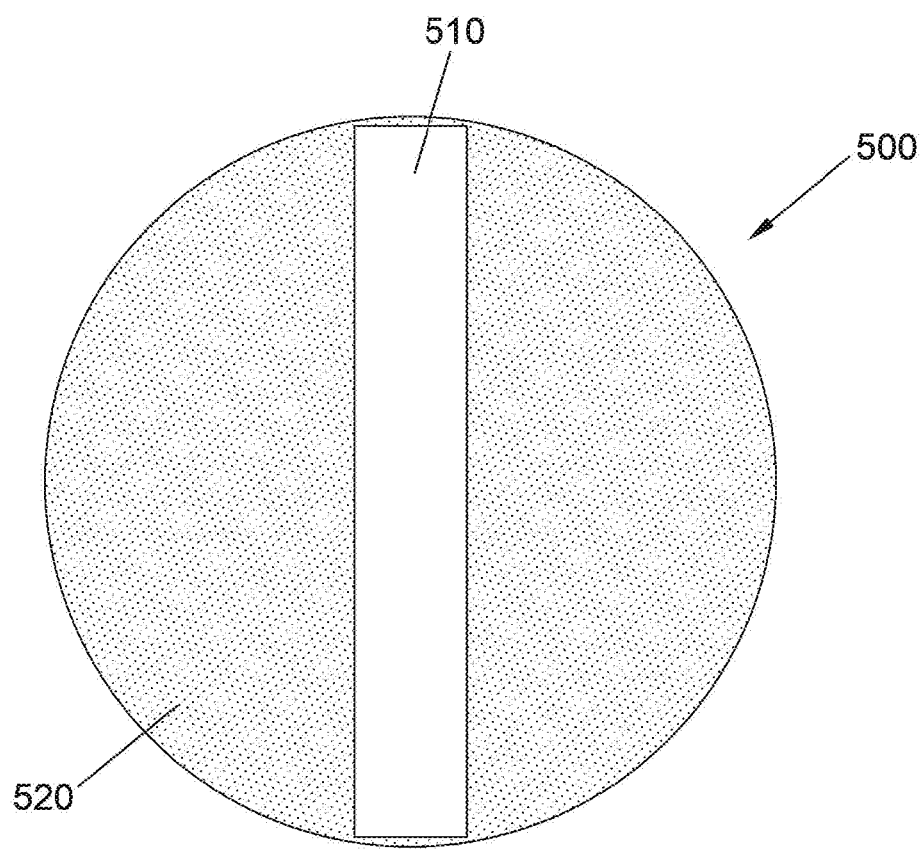
FIG. 22 shows an exemplary mask for reducing astigmatic aberration.

In another implementation of the present technique, the aberration can be circumvented by control of the light intensity at the pupil of the objective lens. By illuminating the pupil with just a thin strip centred on the lens, oriented in the same direction as the fibre core, the astigmatic aberration induced by the fibre geometry is reduced. For example, with reference to FIG. 2A, the process in effect removes light rays which are not vertical in the radial plane shown in this image. Then the only light incident in the fibre 100 is that shown in the plane depicted in FIG. 2B, which may be focussed as needed into the core 110. FIG. 22 shows an exemplary mask 500 for reducing astigmatic aberration in this manner. The mask 500 comprises a slit 510 which permits transmission of light, and opaque portions 520 which block light.

This illumination strategy has a further advantage that, in stopping down the NA of the lens in a direction perpendicular to the fibre core, the focus 333 is spread in that direction such that it covers a greater proportion of the area of the core 110. This is useful for increasing the overlap between the laser modification and the propagating fibre mode. The strip of light at the pupil can be created adaptively using an adaptive optical element. This has the advantage that phase correction can also be applied simultaneously if required.

Note that the slit illumination is only effective in negating the aberration if one is simply interested in focusing inside the fibre core 110.

If one wants to focus inside the cladding 120 as well, some aberration correction may still be required as described above. Equally, when using some higher NA lenses or fibre with higher refractive index, it may be needed to compensate spherical aberration even when using the slit illumination. A fixed mechanical slit made of metal or any other suitably opaque material that effectively blocks laser light may also be effective in generating the required pupil illumination for the core, though this will not permit phase control of the transmitted light as achieved by an active optical element.

The fibres described herein and depicted in the figures are merely exemplary. Various fibre types may be used with the present invention. Some further examples are as follows:

Silica Optical Fibres

Standard single mode silica: typically have a core of approximately 8 µm, cladding of 125 µm, a polyacrylate coating of 200 µm. The fibre has a refractive Index 1.45, and a difference in refractive index between core and cladding of approximately 0.001.

High Numerical Aperture fibre: with 80 µm fibre used for tight bend radii.

Multimode fibre typically 50 µm or 62 µm core with 125 µm cladding.

Polarisation maintaining (PM) fibre: This fibre has an asymmetry, such that the two orthogonal polarisation modes have different effective refractive indices. For example PANDA fibre, Bow-Tie fibre, elliptical cladding fibre. An FBG written in PM fibre has different reflection wavelengths for the two polarisation modes as they have different refractive indices.

Air-hole fibre: drawn with air holes as per FIG. 8. FBGs in air-hole fibre can be used as pressure sensors. As the pressure increases the asymmetry in the fibre changes, causing an increase in birefringence.

Photonic Crystal Fibre: fibre drawn with periodic array of holes. Light guided in centre. Central region may be solid core or hollow core.

Multi-core fibre: there are multiple cores in the same cladding. This allows multiple independent signals to be launched into the same fibre. This technique allows for precise targeting. An FBG could be written in one core, without affecting the other cores. Different cores could have FBGs at different wavelengths at the same point. Alternatively it could be used to increase multiplexing density.

There may also be many variations in fibre designs, dimensions and refractive index profiles.

Polymer Optical Fibre (Plastic Optical Fibre)

Core/cladding 62.5 µm/250 µm to 500 µm/750 µm, core index 1.49 to 1.59, cladding index 1.46.

Sapphire Optical Fibre

Single crystal in short lengths (e.g. up to 2 m). Rounded hexagonal cross-section. Wide diameter (400 µm to 250 µm). No cladding—interface is between high refractive index sapphire and air/surrounding medium. Very multi-model. Refractive index 1.75-1.76 (wavelength dependent). Melting point 2040° C.

Hydrogel Optical Fibre

Biocompatible fibre. See "Highly Stretchable, Strain Sensing Hydrogel Optical Fibers Jingjing Guo, Xinyue Liu, Nan Jiang, Ali K. Yetisen, Hyunwoo Yuk, Changxi Yang, Ah Khademhosseini, Xuanhe Zhao, and Seok-Hyun Yun", Adv. Mater. 2016, 28, 10244-10249.

The invention claimed is:

1. A method of laser modifying an optical fibre to form a modified region at a target location within the fibre, comprising:
    positioning at least a portion of an optical fibre in a laser system for modification by a laser;
    determining a correction to be applied to an active optical element of the laser system based at least upon characteristics of the optical fibre;
    applying the correction to the active optical element of the laser system to modify wavefront properties of the laser to counteract an effect of aberration of the fibre on laser focus, wherein applying the correction to the active optical element comprises applying the correction to the active optical element to modify wavefront properties of the laser to counteract an effect of spherical aberration on laser focus or of coma on laser focus or both spherical aberration and coma on laser focus; and
    laser modifying the optical fibre at the target location using the laser with the corrected wavefront properties to produce the modified region.

2. A method as claimed in claim 1, wherein the step of determining the correction comprises determining the correction based upon the position of the target location within the fibre.

3. A method as claimed in claim 1 wherein the step of applying the correction to the active optical element comprises applying the correction to the active optical element to modify wavefront properties of the laser to counteract an effect of astigmatic aberration on laser focus.

4. A method as claimed in claim 1, comprising determining at least one characteristics of the optical fibre and determining the correction based at least upon said at least one characteristic.

5. A method as claimed in claim 1, comprising changing the correction based upon a change of the target location within the optical fibre.

6. A method as claimed in claim 1, comprising modifying a plurality of regions which are spatially separated from one another within a transverse cross-section of the fibre.

7. A method as claimed in claim 1, wherein the correction counteracts an effect of aberration on laser focus caused by refraction at a plurality of optical interfaces of the fibre.

8. A method as claimed in claim 1, wherein the correction counteracts an effect of astigmatic aberration on laser focus caused by the outer surface of the fibre, and/or an effect of astigmatic aberration on laser focus caused by an interface between a fibre core and cladding surrounding the fibre core.

9. A method as claimed in claim 1, wherein the correction counteracts an effect of coma on laser focus caused by the outer surface of the fibre, and/or an effect of coma on laser focus caused by an interface between a fibre core and cladding surrounding the fibre core.

10. A method as claimed in claim 1, comprising modifying a region of the fibre proximate a channel within the fibre.

11. A method as claimed in claim 1, wherein the correction is a phase field comprising a discontinuity for applying different corrections to rays incident on different parts of the fibre.

12. A method as claimed in claim 1, comprising using a dry objective lens.

13. A method as claimed in claim 1, comprising etching the laser modified region to form a micro-channel.

14. A method of laser modifying an optical fibre to form a modified region at a target location within the fibre, comprising:
    positioning at least a portion of an optical fibre in a laser system for modification by a laser;
    determining a correction to be applied to an active optical element of the laser system based at least upon characteristics of the optical fibre;
    applying the correction to the active optical element of the laser system to modify wavefront properties of the laser to counteract an effect of aberration of the fibre on laser focus; and
    laser modifying the optical fibre at the target location using the laser with the corrected wavefront properties to produce the modified region;
    wherein the focus of the corrected laser has a Strehl ratio of at least 0.5.

15. A method of laser modifying an optical fibre to form a modified region at a target location within the fibre, comprising:
    positioning at least a portion of an optical fibre in a laser system for modification by a laser;
    determining a correction to be applied to an active optical element of the laser system based at least upon characteristics of the optical fibre;
    applying the correction to the active optical element of the laser system to modify wavefront properties of the laser to counteract an effect of aberration of the fibre on laser focus;
    laser modifying the optical fibre at the target location using the laser with the corrected wavefront properties to produce the modified region;
    measuring the laser focus within the optical fibre and determining the correction based at least upon that measurement.

16. A method of laser modifying an optical fibre to form a modified region at a target location within the fibre, comprising:
    positioning at least a portion of an optical fibre in a laser system for modification by a laser;
    determining a correction to be applied to an active optical element of the laser system based at least upon characteristics of the optical fibre;
    applying the correction to the active optical element of the laser system to modify wavefront properties of the laser to counteract an effect of aberration of the fibre on laser focus; and
    laser modifying the optical fibre at the target location using the laser with the corrected wavefront properties to produce the modified region;
    wherein producing the modified region comprises forming at least a section of an optical core of the fibre; and/or wherein the method comprises forming a plurality of sections of optical cores.

17. A method of laser modifying an optical fibre to form a modified region at a target location within the fibre, comprising:
    positioning at least a portion of an optical fibre in a laser system for modification by a laser;
    determining a correction to be applied to an active optical element of the laser system based at least upon characteristics of the optical fibre;
    applying the correction to the active optical element of the laser system to modify wavefront properties of the laser to counteract an effect of aberration of the fibre on laser focus;
    laser modifying the optical fibre at the target location using the laser with the corrected wavefront properties to produce the modified region; and
    forming the modified region within an optical core of the optical fibre.

18. A method as claimed in claim 17, comprising translating the optical fibre during modification thereof; and/or comprising rotating the optical fibre about its longitudinal axis.

19. A method as claimed in claim 17, comprising forming a fibre Bragg grating within the fibre.

20. A method as claimed in claim 17, wherein the optical fibre comprises at least one of a sapphire fibre, a photonic crystal fibre, a polymer fibre, a silica fibre, a hydrogel fibre, a high refractive index optical fibre, a non-cylindrical optical fibre, a multimode fibre, a polarisation maintaining fibre, an air-hole fibre, or a multi-core fibre.

21. A method of laser modifying an optical fibre to form a modified region at a target location within the fibre, comprising:
  positioning at least a portion of an optical fibre in a laser system for modification by a laser;
  determining a correction to be applied to an active optical element of the laser system based at least upon characteristics of the optical fibre;
  applying the correction to the active optical element of the laser system to modify wavefront properties of the laser to counteract an effect of aberration of the fibre on laser focus:
  laser modifying the optical fibre at the target location using the laser with the corrected wavefront properties to produce the modified region; and
  forming a single-mode sapphire optical fibre.

* * * * *